(12) United States Patent
Homma et al.

(10) Patent No.: US 10,305,905 B2
(45) Date of Patent: May 28, 2019

(54) ACCESS CONTROL DEVICE, COMMUNICATION SYSTEM, PROGRAM, AND METHOD FOR CONTROLLING ACCESS

(71) Applicants: Takeshi Homma, Kanagawa (JP); Yohei Yamamoto, Tokyo (JP); Kaoru Maeda, Kanagawa (JP)

(72) Inventors: Takeshi Homma, Kanagawa (JP); Yohei Yamamoto, Tokyo (JP); Kaoru Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 207 days.

(21) Appl. No.: 15/213,557

(22) Filed: Jul. 19, 2016

(65) Prior Publication Data

US 2016/0330202 A1  Nov. 10, 2016

Related U.S. Application Data

(63) Continuation of application No. PCT/JP2015/050829, filed on Jan. 14, 2015.

(30) Foreign Application Priority Data

Jan. 31, 2014 (JP) ................................. 2014-016922

(51) Int. Cl.
*H04L 29/06* (2006.01)
*G06F 21/12* (2013.01)
(Continued)

(52) U.S. Cl.
CPC ................ *H04L 63/10* (2013.01); *G06F 1/16* (2013.01); *G06F 1/1613* (2013.01);
(Continued)

(58) Field of Classification Search
CPC ............. H04L 63/10; H04L 9/14; H04L 9/32; H04L 63/08; H04L 63/0823; G06F 1/16; G06F 21/12; G06G 1/1613
(Continued)

(56) References Cited

U.S. PATENT DOCUMENTS 6,766,353 B1 *  7/2004  Lin ......................... G06F 21/64
                                                      709/201
9,064,100 B2     6/2015  Okita
(Continued)

FOREIGN PATENT DOCUMENTS

CN      103546887 A    1/2014
JP      2003-256376    9/2003
(Continued)

OTHER PUBLICATIONS

Tao, "AccessAuth: Capacity-aware security access authentication in federated-IoT-enabled V2G networks", Oct. 4, 2017, Elsevier, pp. 107-117 (Year: 2017).*

(Continued)

*Primary Examiner* — Taghi T Arani
*Assistant Examiner* — Gregory A Lane
(74) *Attorney, Agent, or Firm* — Oblon, McClelland, Maier & Neustadt, L.L.P.

(57) ABSTRACT

An access control device for controlling an access by a communication terminal to an application includes an authentication method management means configured to manage each of the application in association with authentication information, which indicates an effective authentication method effective for authenticating an access request source of an access request to access the application, an authenticating means configured to authenticate the access request source using a usable authentication method, which can be used in the communication terminal, based on the (Continued)

access request, an access request receiving means configured to receive the access request to access an intended application from the communication terminal, and an access control means configured to control the communication terminal so that the communication terminal does not access the intended application in a case where the authentication method management means does not manage the authentication information, which indicates the authentication method used for the authentication.

6 Claims, 19 Drawing Sheets

(51) Int. Cl.
| | | |
|---|---|---|
| *G06F 21/31* | (2013.01) | |
| *G09C 1/00* | (2006.01) | |
| *H04L 9/14* | (2006.01) | |
| *H04L 9/32* | (2006.01) | |
| *H04W 12/06* | (2009.01) | |
| *H04W 12/08* | (2009.01) | |
| *G06F 1/16* | (2006.01) | |
| *G06F 1/18* | (2006.01) | |
| *H04M 1/72* | (2006.01) | |
| *H04N 7/14* | (2006.01) | |

(52) U.S. Cl.
CPC ............ *G06F 1/1686* (2013.01); *G06F 1/182* (2013.01); *G06F 21/12* (2013.01); *G06F 21/31* (2013.01); *G09C 1/00* (2013.01); *H04L 9/14* (2013.01); *H04L 9/32* (2013.01); *H04L 63/08* (2013.01); *H04L 63/083* (2013.01); *H04L 63/0823* (2013.01); *H04L 63/102* (2013.01); *H04M 1/72* (2013.01); *H04N 7/147* (2013.01); *H04W 12/06* (2013.01); *H04W 12/08* (2013.01)

(58) Field of Classification Search
USPC .......................................................... 726/23
See application file for complete search history.

(56) References Cited

U.S. PATENT DOCUMENTS

| | | | |
|---|---|---|---|
| 2005/0272445 A1* | 12/2005 | Zellner | ................... H04L 41/12 455/456.2 |
| 2007/0079356 A1* | 4/2007 | Grinstein | ................ H04L 63/08 726/2 |
| 2008/0148351 A1 | 6/2008 | Bhatia et al. | |
| 2009/0094164 A1* | 4/2009 | Fontaine | ............ G06Q 20/3674 705/67 |
| 2014/0281728 A1 | 9/2014 | Homma | |
| 2014/0324975 A1 | 10/2014 | Tamura | |

FOREIGN PATENT DOCUMENTS

| | | |
|---|---|---|
| JP | 2006-251868 | 9/2006 |
| JP | 2008-227577 | 9/2008 |
| JP | 2011-100268 | 5/2011 |
| JP | 2012-134940 | 7/2012 |
| JP | 5089621 | 12/2012 |

OTHER PUBLICATIONS

Extended European Search Report dated Dec. 1, 2018 in Patent Application No. 15743099.2.
International Search Report dated Apr. 7, 2015 in PCT/JP2015/050829 filed on Jan. 14, 2015 ( with English Translation).
Written opinion dated Apr. 7, 2015 in PCT/JP2015/050829, filed on Jan. 14, 2015.
Chinese Office Action dated Nov. 1, 2018 in Chinese Application No. 201580005921.X, with English translation. (citing document AO, therein), 26 pages.

* cited by examiner

FIG.9

| TERMINAL ID | PASSWORD | CERTIFICATE AUTHENTICATION |
|---|---|---|
| 01aa | aaaa | — |
| 01ab | — | OK |
| 01ac | cccc | OK |
| ... | ... | ... |

FIG.10

| APP ID / TERMINAL ID | a001 | a002 | a003 | ... |
|---|---|---|---|---|
| 01aa | If (2014/1/1~ 2014/9/30) On | On | Off | ... |
| 01ab | On | On | On | ... |
| 01ac | On | On | On | ... |
| ... | ... | ... | ... | ... |

FIG.11

| APP ID | ICON URL | APP URL |
|---|---|---|
| a001 | https://ucs.Ulricoh.com/aaa/aicon.jpg | https://ucs.Ulricoh.com/aaa/aaa.html |
| a002 | https://ucs.Ulricoh.com/bbb/bicon.jpg | https://ucs.Ulricoh.com/bbb/bbb.html |
| a003 | https://ucs.Ulricoh.com/ccc/cicon.jpg | https://ucs.Ulricoh.com/ccc/ccc.html |
| a004 | https://ucs.Ulricoh.com/ddd/dicon.jpg | https://ucs.Ulricoh.com/ddd/ddd.html |
| ... | ... | ... |

FIG.12

| APP ID | AUTHENTICATION METHOD |
|---|---|
| a001 | PASSWORD/CLIENT CERTIFICATE |
| a002 | PASSWORD/CLIENT CERTIFICATE |
| a003 | CLIENT CERTIFICATE |
| ... | ... |

FIG.13

| TERMINAL ID | APP ID | ACCESS TOKEN |
|---|---|---|
| 01aa | a001 | abcdefg |
| ... | ... | ... |
| 01ac | a002 | qwertyu |
| ... | ... | ... |

ACCESS CONTROL DEVICE, COMMUNICATION SYSTEM, PROGRAM, AND METHOD FOR CONTROLLING ACCESS

CROSS-REFERENCE TO RELATED APPLICATIONS

The present application is a continuation application of International Application No. PCT/JP2015/050829, filed Jan. 14, 2015, which claims priority to Japanese Patent Application No. 2014-016922, filed Jan. 31, 2014. The contents of these applications are incorporated herein by reference in their entirety.

BACKGROUND OF THE INVENTION

Field of the Invention

The present disclosure relates to access control devices, and in particular, an access control device for an access by a communication terminal to an application.

Description of the Related Art

In recent years, along with needs for reducing expenses for business trips and periods of the business trips, communication systems for communicating through a communication network such as the Internet and a dedicated line have become popular. For example, in a teleconference system among the communication systems, a teleconference can be implemented by sending and receiving image data and audio data (see Patent document 1).

Further, in the teleconference system, there is known a method for reporting a uniform resource identifier (URI) of a transmission management system, an update system, a screen providing system, or the like to a communication terminal based on terminal certificate information used for authentication for the communication terminal (see Patent document 2). With this method, a convenience is improved because an access to each service provider for a transmission management system is enabled with single authentication.

Meanwhile, an application for providing a service has been developed. This application is, for example, a Java ("Java" is a registered trademark) application, which is operable without depending on a platform. With this, because communication terminals such as a personal computer (PC) and a dedicated terminal for a teleconference respectively of different platforms cause the same application to run, a service of causing different terminals to collaborate for communications and so on between the different terminals is enabled to be provided.

[Patent document 1] Japanese Unexamined Patent Application Publication No. 2008-227577
[Patent document 2] Japanese Unexamined Patent Application Publication No. 2012-134940

SUMMARY OF THE INVENTION

According to one aspect of the present invention, an access control device for controlling an access by a communication terminal to an application includes an authentication method management means, an authenticating means, an access request receiving means, and an access control means. The authentication method management means is configured to manage each of the application in association with authentication information, which indicates an effective authentication method effective for authenticating an access request source of an access request to access the application. The authenticating means is configured to authenticate the access request source using a usable authentication method, which can be used in the communication terminal, based on the access request. The access request receiving means is configured to receive the access request to access an intended application from the communication terminal. The access control means is configured to control the communication terminal so that the communication terminal does not access the intended application in a case where the authentication method management means does not manage the authentication information, which indicates the authentication method used for the authentication, and the communication terminal accesses the intended application in a case where the authentication method management means manages the authentication information, which indicates the authentication method used for the authentication.

BRIEF DESCRIPTION OF THE DRAWINGS

FIG. 9 is a schematic diagram of a terminal authentication management table;
FIG. 10 is a schematic diagram of an app use management table;
FIG. 11 is a schematic diagram of an app URL management table;
FIG. 12 is a schematic diagram of an app permission management table;
FIG. 13 is a schematic diagram of an access token management table.

DESCRIPTION OF THE EMBODIMENTS

When the platforms respectively of the communication terminals are different, authentication methods being respectively usable by the communication terminals may differ. Therefore, in a case where an access to the application is permitted based on the authentication using the authentication method used by each communication terminal, a reliability differs for each authentication method. Accordingly, there occurs a problem that the security expected by an application side is hard to assure.

Hereinafter, referring to figures, an embodiment of the present invention is described.

First Embodiment

At first, a first embodiment of the present invention is described.

<<General Arrangement of the Embodiment>>

Figure 1:
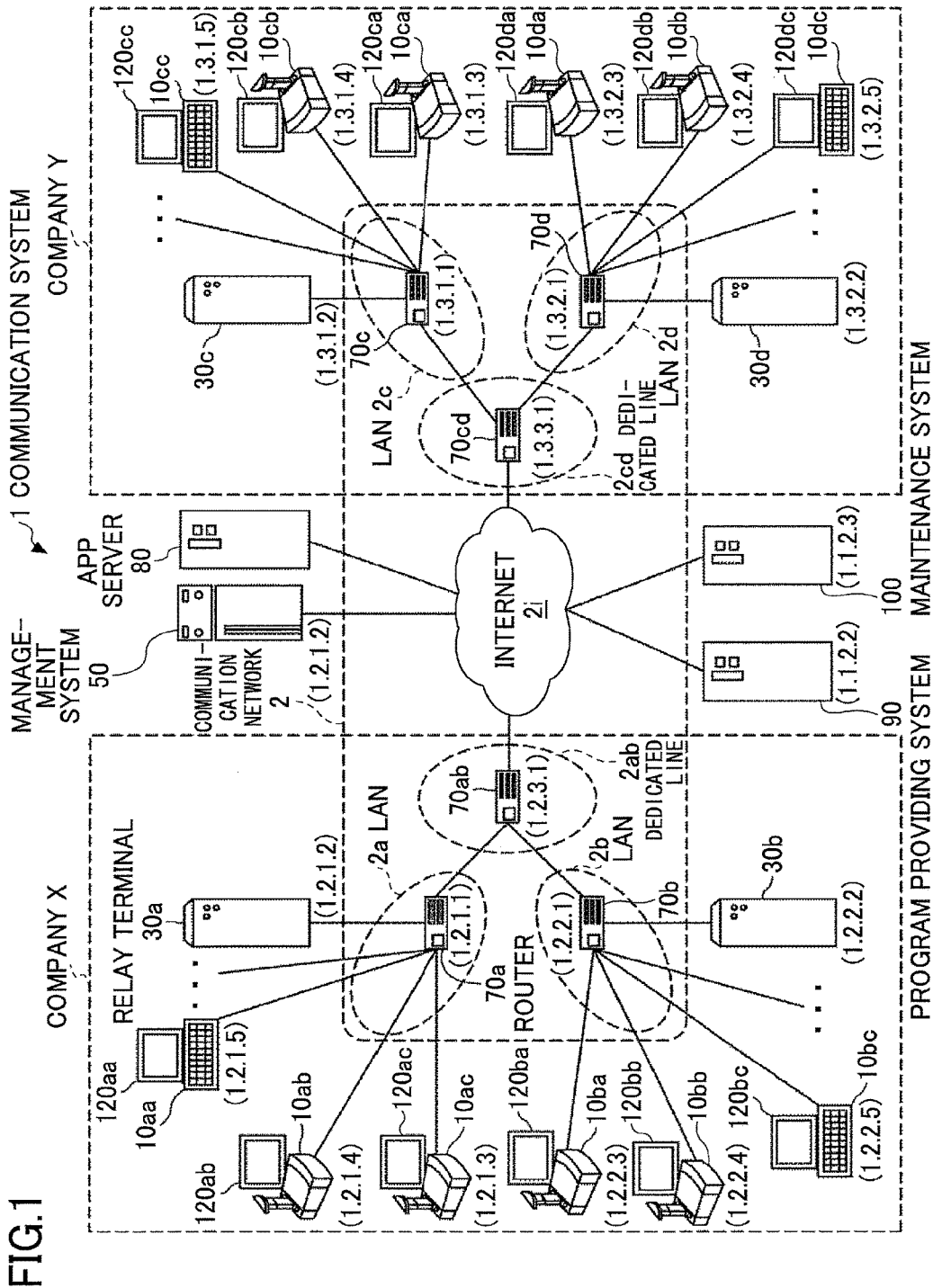
FIG. 1 is a schematic diagram of a communication system according to an embodiment of the present invention.

FIG. 1 is a schematic diagram of a communication system according to the first embodiment of the present invention. As illustrated in FIG. 1, the communication system 1 includes multiple communication terminals (10aa, 10ab, . . . ), displays (120aa, 120ab, . . . ) respectively for the multiple communication terminals (10aa, 10ab, . . . ), multiple relay terminals (30a, 30b, 30c, 30d), a communication management system 50, an application server 80, a program providing system 90, and a maintenance system 100.

In the following descriptions, "application" may be abbreviated as "app". Hereinafter, the "communication terminal" may be simply represented by a "terminal", and the "communication management system" may be simply represented by a "management system". Hereinafter, an arbitrary terminal among the multiple terminals (10aa, 10ab, . . . ) is indicated as a "terminal 10", an arbitrary display among the multiple displays (120aa, 120ab, . . . ) is indicated as a "display 120", and an arbitrary relay terminal among the multiple relay terminals (30a, 30b, 30c) is indicated as a "relay terminal 30". An arbitrary router among multiple routers (70a, 70b, 70c, 70d, 70ab, 70cd) is indicated as a "router 70". These communications are actually conducted using a sound, a video image (an image), or the sound and the video image (the image).

The communication system 1 is enabled to implement a teleconference or the like between remote locations by communications of image data and audio data, which are examples of communication data. The multiple routers (70a, 70b, 70c, 70d, 70ab, and 70cd) are configured to select an optimal path for the communication data. Further, the app server 80 manages various apps (online apps) respectively operated in the terminals 10. The terminals 10 download various apps from the app server 80 and use the various apps.

Further, the terminals (10aa, 10ab, 10ac, . . . ), the relay terminal 30a, and the router 70a are coupled so as to be communicable by a LAN 2a. The communication terminals (10ba, 10bb, 10bc, . . . ), the relay terminal 30b, and the router 70b are coupled so as to be communicable by a LAN 2b. Further, the LAN 2a and the LAN 2b are coupled so as to be communicable by a dedicated line 2ab including the router 70ab. Further, the LAN 2a, the LAN 2b, and the dedicated line 2ab are built up inside a company X, which is an example of a company. For example, the LAN 2a is built up inside an office A of the company X, and the LAN 2b is built up inside an office B of the company X.

The terminals (10aa, 10bc) among the terminals 10 held by the company X are general-purpose terminals, which are used for the teleconference and can be used for usage unrelated to the teleconference. The remaining terminals 10 held by the company X are dedicated terminals, which can be used for the teleconference. A platform for the dedicated terminal and a platform for the general-purpose terminal are different.

Meanwhile, the communication terminals (10ca, 10cb, 10cc, . . . ), the relay terminal 30c, and the router 70c are coupled so as to be communicable by a LAN 2c. The communication terminals (10da, 10db, 10dc, . . . ), the relay terminal 30d, and the router 70d are coupled so as to be communicable by a LAN 2d. Further, the LAN 2c and the LAN 2d are coupled so as to be communicable by a dedicated line 2cd including the router 70cd. Further, the LAN 2c, the LAN 2d, and the dedicated line 2cd are built up inside a company Y, which is an example of a predetermined company. For example, the LAN 2c is built up inside an office C of the company Y, and the LAN 2d is built up inside an office D of the company Y. The company X and the company Y are coupled respectively by the routers (70ab, 70cd) through the Internet 2i so as to be communicable.

The terminals (10cc, 10dc) among the terminals 10 held by the company Y are general-purpose terminals, which are used for the teleconference and can be used for usage unrelated to the teleconference. The remaining terminals 10 held by the company Y are dedicated terminals, which can be used for the teleconference. A platform for the dedicated terminal and a platform for the general-purpose terminal are different.

The management system 50, the application server 80, the program providing system 90, and the maintenance system 100 are coupled to the Internet 2i. Installation locations of the management system 50, the program providing system 90, and the maintenance system 100 are not limited. These installation locations may be the same region or the same country, or different regions or different countries.

Within the first embodiment, a communication network 2 of the first embodiment is built up by the LAN 2a, the LAN 2b, the dedicated line 2ab, the Internet 2i, the dedicated line 2cd, the LAN 2c, and the LAN 2d. This communication network 2 is not limited to be wired and may include a part where a wireless communication such as wireless fidelity (WiFi) or Bluetooth ("Bluetooth" is a registered trademark) is used.

Further, referring to FIG. 1, a set of four numbers attached below each of the transmission terminals 10, the relay terminals 30, the management system 50, the routers 70, the program providing system 90, and the maintenance system 100 simply indicates an internet protocol (IP) address in the ordinary Internet protocol version 4 (IPv4). For example, the IP address of the terminal 10aa is "1.2.1.3". Although the internet protocol version 6 (IPv6) may be used instead of the IPv4, the IPv4 is used here to simplify the explanations.

The terminals 10 may be used to communicate between multiple offices, between different rooms within the same office, in the same room, between outdoors and indoors, and between the outdoors and indoors. In the case where the terminals 10 are used outdoors, a wireless communication may be conducted using a mobile telephone communication network or the like.

Further, the terminals 10 illustrated in FIG. 1 are terminals implementing communications of users by sending and receiving communication data, for example, a terminal for a teleconference. Further, the terminal 10 sends and receives the communication data using a predetermined communication system (a call control system for coupling to or disconnecting from a communication destination, and a coding system for converting the communication data into IP packets).

The above call control system includes (1) session initiation protocol (SIP), (2) H.323, (3) an extension to SIP, (4) an instant messaging protocol, (5) a protocol using a SIP MESSAGE method, (6) internet relay chat (IRC) protocol, and (7) an extension to the instant messaging protocol, and so on. Here, (4) the instant messaging protocol is, for example, a protocol used by (4-1) an extensible messaging and presence protocol (XMPP), and (4-2) protocols used by ICQ ("ICQ" is a registered trademark), AIM ("AIM" is a registered trademark), and Skype ("Skype" is a registered trademark). An example of the extension of (7) the instant messaging protocol is, for example, Jingle.

Further, the terminal 10 downloads an app for a teleconference or another usage from the app server 80 and uses the app based on a user operation. In a case where the multiple terminals 10 use the same app, these terminals 10 may implement communications with each other through the communication network 2. Here, the apps include a communication app and a message app, which are apps for a teleconference, Skype, Google Talk, LINE, FaceTime, Kakao Talk, and Tango ("Skype", "Google Talk", "LINE", "FaceTime", "Kakao Talk", and "Tango" are registered or unregistered trademarks), for example.

Further, the management system 50 manages information for authentication/permission for the terminal 10 and has a function of an access permission system which authenticates the terminal 10 and permits an access to the app. The app server 80 is a server hosting the uniform resource identifier (URI), which indicates the substance of the app.

Figure 2:
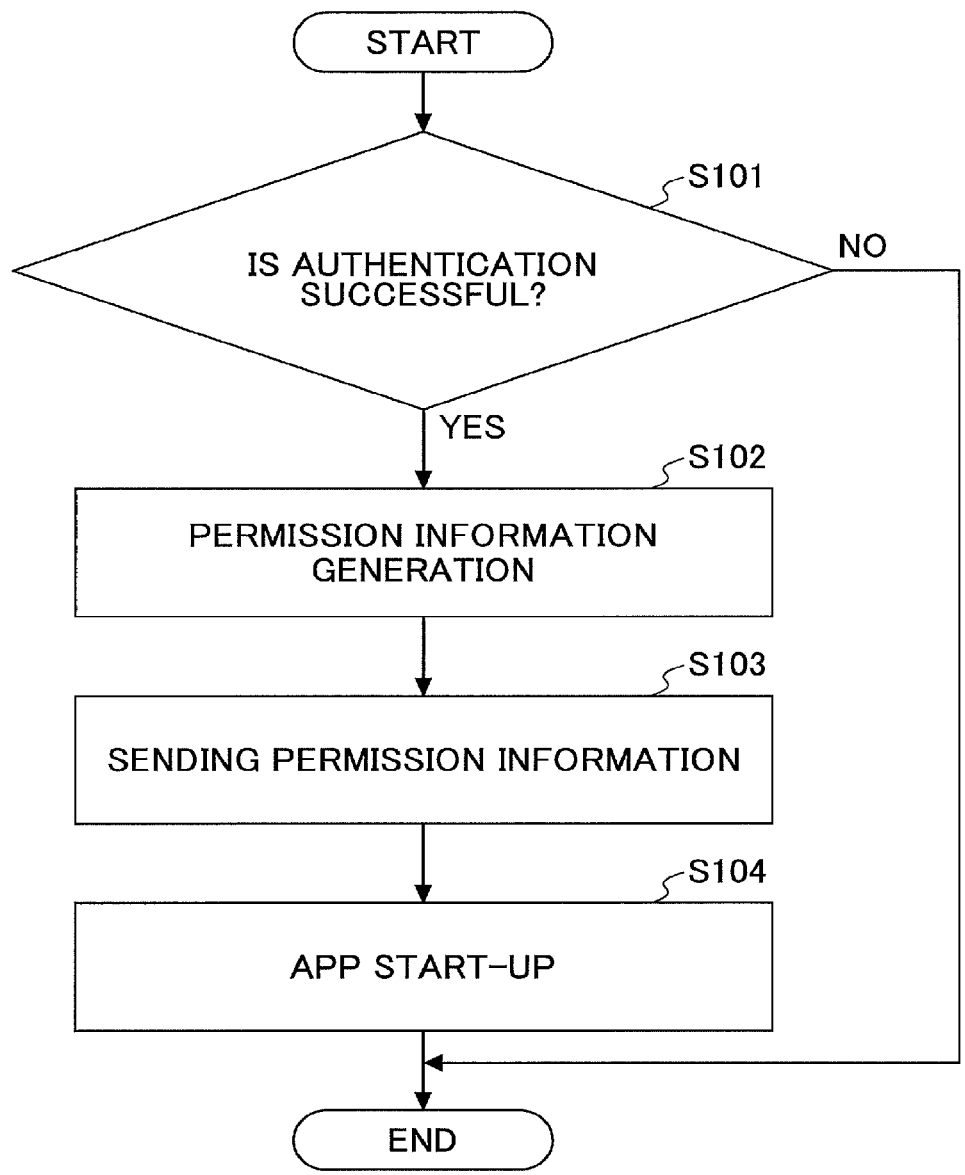
FIG. 2 is a flowchart illustrating an authentication/permission method.

The terminal 10 can use various apps through the communication network 2. In this case, the terminal 10 acquires the URI for the app server 80 hosting the app and access the app server 80. Within the first embodiment, in order to prevent an unauthorized use such as spoofing and an information leakage, the authentication/permission method illustrated in FIG. 2 can be used to use these apps. FIG. 2 is a flowchart illustrating the authentication/permission method. It is checked whether the authentication is successful in step S101. In a case of NO in step S101, the flow ends. On the other hand, in a case of YES in step S101, permission information is generated in step S102. In step S103, the permission information is sent. In step S104, the app is started up. Thereafter, the flow ends. Said differently, the terminal 10 sends an authentication request to the management system 50. In a case where the authentication is successful, the management system 50 generates the permission information such as an access token, which indicates the permission of the access to the app, and sends the permission information to the terminal 10. In the terminal 10, the permission information is sent to the app server 80. Thus, the terminal 10 accesses the app and starts up the app.

The management system 50 receives the authentication request from the terminals 10 such as the dedicated terminal and the general-purpose terminal in various platforms and collectively authenticates the terminals 10 instead of the app side. With this, it is possible to reduce a cost for the authentication on each app side. In this case, because of the difference in the platforms, the authentication method usable for each terminal 10 is also different. Therefore, in a case where the access to the app is permitted for the terminal 10 by a regularly authenticated account, there is a case where reliability expected by the app side is not assured. Therefore, in the communication system 1 of the first embodiment, an account (the terminal 10), an authentication method for the account, and permission information of the app are managed while associating the account, the authentication method, and the permission information so as to enable a limitation of an account method for using the app at a time of permitting app usage. Thus, the security is assured.

<<Hardware Structure of the Embodiment>>

Next, a hardware structure of the first embodiment 1 is described. Firstly, the hardware structure of the terminal 10 is described. The terminal 10 includes a teleconference dedicated terminal (the dedicated terminal), which implements a teleconference between the terminals 10 by using a call app, and a personal computer (PC) (the general-purpose terminal), which can use the call app and can be simultaneously used for usage unrelated to the teleconference. Hereinafter, an external appearance of the dedicated terminal is described.

Figure 3:
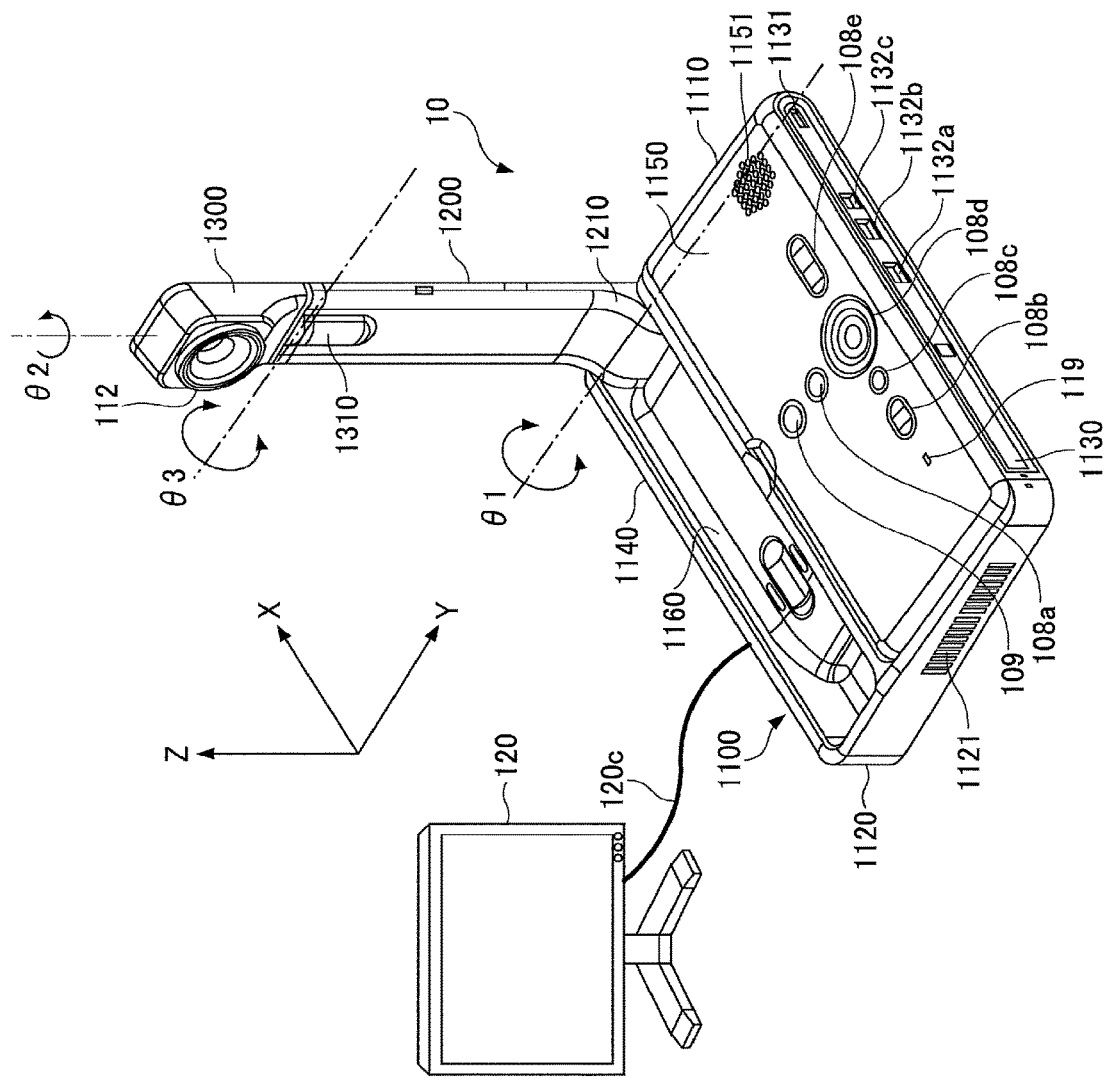
FIG. 3 illustrates an exemplary external view of the communication terminal.

FIG. 3 illustrates an external view of the terminal 10 of the first embodiment. As illustrated in FIG. 3, the terminal 10 includes a casing 1100, an arm 1200, and a camera housing 1300. An air inlet face (not shown) including multiple air inlet holes is arranged at a front sidewall face 1110 of the casing 1100, and an exhaust face 1121 including multiple exhaust holes is arranged at a rear sidewall face 1120 of the casing 1100. In this way, when a cooling fan built inside the casing 1100 is driven, external air at the front side of the terminal 10 may be introduced via the air inlet face (not shown) and discharged at the rear side of the terminal 10 via the exhaust face 1121. An audio pickup hole 1131 is arranged at a right sidewall face 1130 of the casing 1100, and audio such as voice, sound, and noise may be picked up by a built-in microphone 114 (described below).

An operation panel 1150 is formed on a side of the right sidewall face 1130 of the casing 1100. On the operation panel 1150, multiple operation buttons 108a to 108e (described below), a power switch 109 (described below), an alarm lamp 119 (described below), and an audio output face 1151 including multiple audio output holes for causing audio output from a built-in speaker 115 (described below) to pass are disposed. An accommodating section 1160, which is a concave portion for accommodating the arm 1200 and the camera housing 1300, is formed on a left sidewall face 1140 of the casing 1100. Multiple coupling ports 1132a to 1132c for electrically coupling a cable with an external device coupling interface (I/F) 118 (described below) are disposed at the right sidewall face 1130 of the casing 1100. A coupling port (not shown) for electrically coupling a cable 120c for the display 120 to the external device coupling I/F 118 (described below) is disposed at the left sidewall face 1140 of the casing 1100.

In the following description, an arbitrary operation button among the multiple operation buttons 108a to 108e may simply be referred to as "operation button 108", and an arbitrary coupling port among the coupling ports 1132a to 1132c may simply be referred to as "coupling port 1132".

Next, the arm 1200 is attached to the casing 1100 through a torque hinge 1210 so that the arm 1200 can rotate in an up-down direction, within a tilt angle θ1 range of 135 degrees, with respect to the casing 1100. FIG. 3 illustrates a state in which a tilt angle θ1 is 90 degrees. A built-in camera 112 (described below) is disposed inside the camera housing 1300 and is capable of capturing images of a user, a document, a room, or the like. Further, a torque hinge 1310 is formed in the camera housing 1300. The camera housing 1300 is attached to the arm 1200 via the torque hinge 1310. The camera housing 1300 is configured to be rotatable horizontally within a panning angle θ2 range of ±180 degrees from the state of 0 degrees illustrated in FIG. 3, and is configured to be rotatable vertically within a tilt angle θ3 range of ±45 from the state of 0 degrees illustrated in FIG. 3.

The external view of FIG. 3 is an example and is not limited to an external appearance in this external view. The terminal 10 may be, for example, a general-purpose PC, a smartphone, a tablet terminal, an electronic whiteboard, a projection apparatus such as a projector, a car navigation terminal installed in an automobile, an image forming apparatus such as a multifunction peripheral and a printer, or a wearable terminal. A camera and a microphone are not necessarily built-in devices but may instead be externally attached to the terminal 10.

The external appearances of the general-purpose terminal among the terminals 10, the management system 50, the program providing system 90, and the maintenance system 100 may be substantially identical to the external appearances of ordinary server computers. Therefore, descriptions of these external appearances are omitted.

Figure 4:
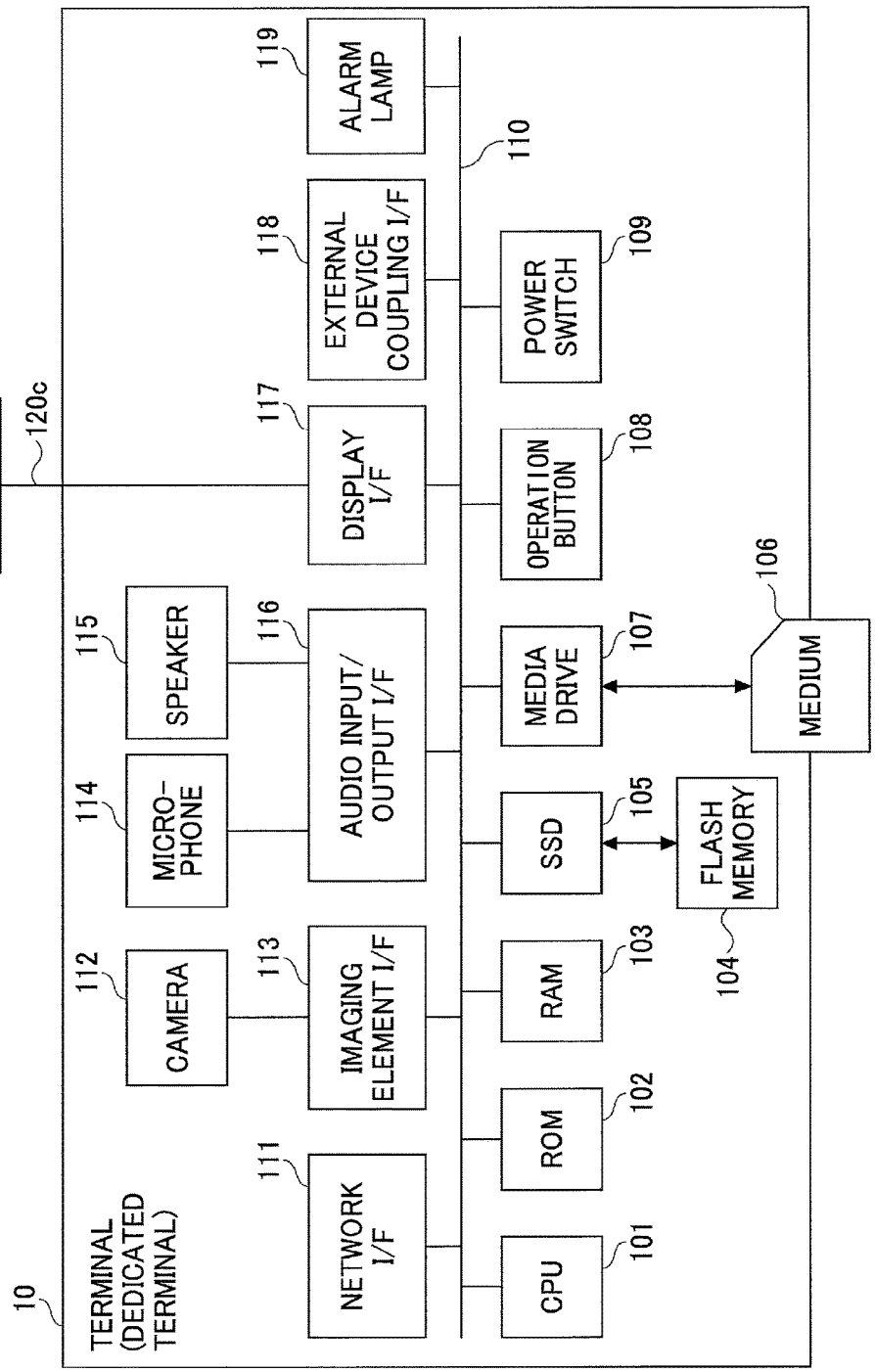
FIG. 4 is a diagram illustrating a hardware structure of the communication terminal.

Described next is a hardware structure of the dedicated terminal among the terminals 10. FIG. 4 is a diagram illustrating a hardware structure of the terminal 10 of the first embodiment. As illustrated in FIG. 4, the terminal 10 of the first embodiment includes a central processing unit (CPU) 101 controlling overall operations of the terminal 10, a read only memory (ROM) 102 storing a program such as an initial program loader (IPL) used to drive the CPU 101, a random access memory (RAM) 103 used as a work area for the CPU 101, a flash memory 104 storing a program for the communication terminal 10 and various data such as image data and audio data, a solid state drive (SSD) 105 controlling to read or write the various data from or to the flash memory 104, a media drive 107 controlling to read or write (store) the data from or to a recordable medium 106 such as a flash memory, the operation button 108 operated in a case where a destination for the terminal 10 is selected, the power switch 109 for switching over ON/OFF of a power source of the terminal 10, and a network interface (I/F) 111 for conducting data transmission using the communication network 2.

Further, the terminal 10 includes a built-in camera 112 capturing an image of an object in conformity with a control by the CPU 101 and obtaining image data, an imaging element interface (I/F) 113 controlling drive operations of the built-in camera 112, the microphone 114 inputting voice, a built-in speaker 115 for outputting voice, a voice input/output interface (I/F) 116 inputting and outputting a voice signal between the microphone 114 and the speaker 115 in conformity with the control by the CPU 101, a display interface (I/F) 117 transmitting the image data to an external display 120 in conformity with the control by the CPU 101, the external device coupling I/F 118 coupling various external devices, and the alarm lamp 119 reporting an abnormality of various functions of the terminal 10, and a bus line 110 such as an address bus and a data bus for electrically coupling the above components as illustrated in FIG. 4.

The display 120 is a display unit including liquid crystal or organic electroluminescence (EL) for displaying the image of an object or an operation screen, for example. The display 120 is coupled to the display I/F 117 by the cable 120c. This cable 120c may be a cable for an analog RGB (video graphics array (VGA)) signal, a cable for a component video, a cable for a high-definition multimedia interface (HDMI) ("HDMI" is a registered trademark) signal, or a cable for a digital video interactive (DVI) signal.

The camera 112 includes a lens and a solid state imaging element that converts light into an electrical charge to digitize the image (the video image) of the object. Complementary metal oxide semiconductor (CMOS), charge coupled device (CCD), or the like is used as the solid state imaging element.

Figure 6:
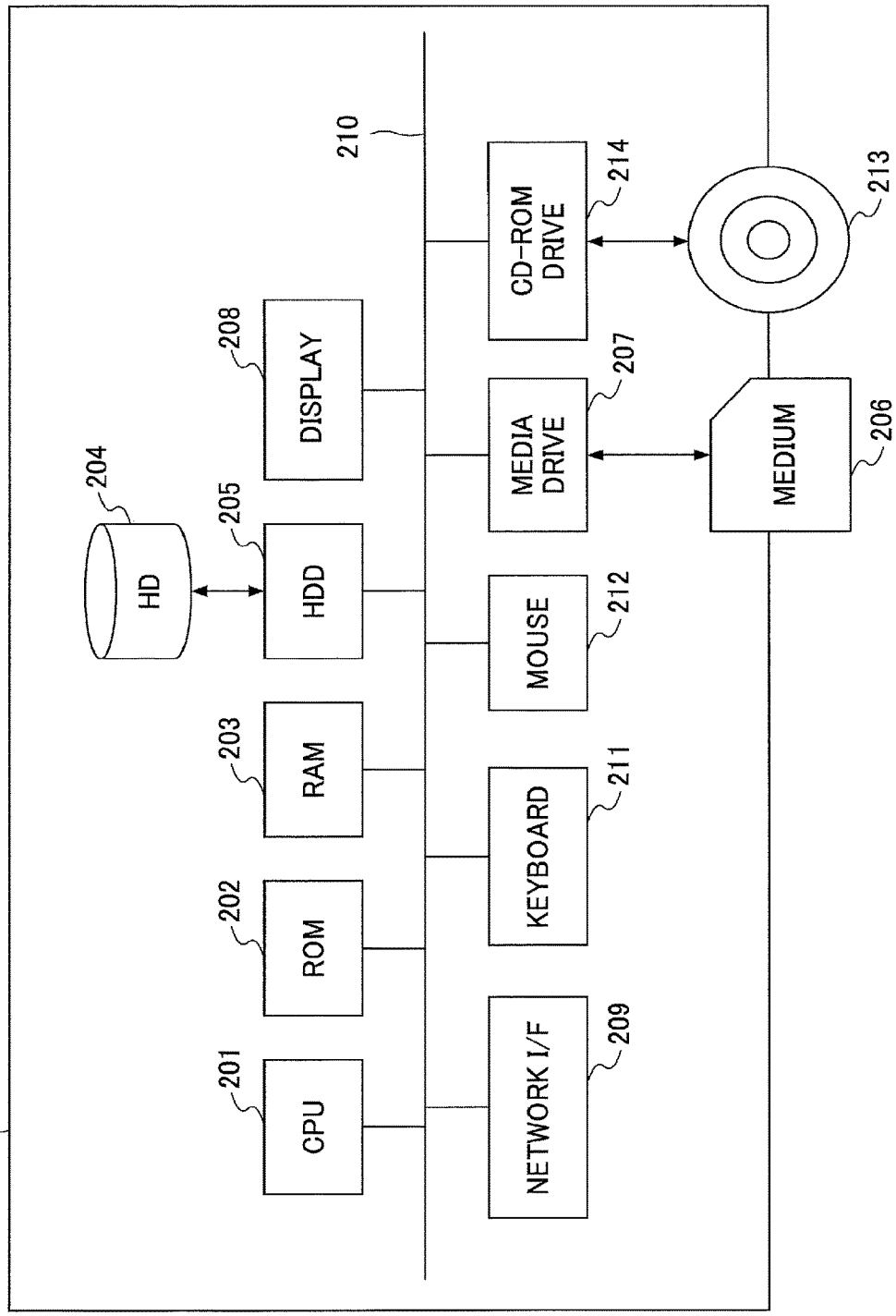
FIG. 6 is a diagram illustrating a hardware structure of a communication management system and a relay terminal.

The external device coupling I/F 118 may be electrically coupled to an external device such as an external camera, an external microphone, and an external speaker by, for example, a universal serial bus (USB) cable that is coupled to the coupling port 1132 of the casing 1100 illustrated in FIG. 6. In a case where the external camera is coupled to the external device coupling I/F 118, a drive operation of the external camera may be prioritized over a drive operation of the built-in camera 112 in conformity with a control by the CPU 101. Similarly, in a case where the external microphone or the external speaker is coupled to the external device coupling I/F 118, a drive operation of the external microphone or the external speaker may prioritize over a drive operation of the built-in microphone 114 or the built-in speaker 115 in conformity with a control by the CPU 101.

Here, the recordable medium 106 may be attachable to or detachable from the terminal 10. A non-volatile memory such as an electrically erasable and programmable read only memory (EEPROM), which reads or writes data in conformity with the control of the CPU 101, may be used instead of the flash memory 104, for example.

Figure 5:
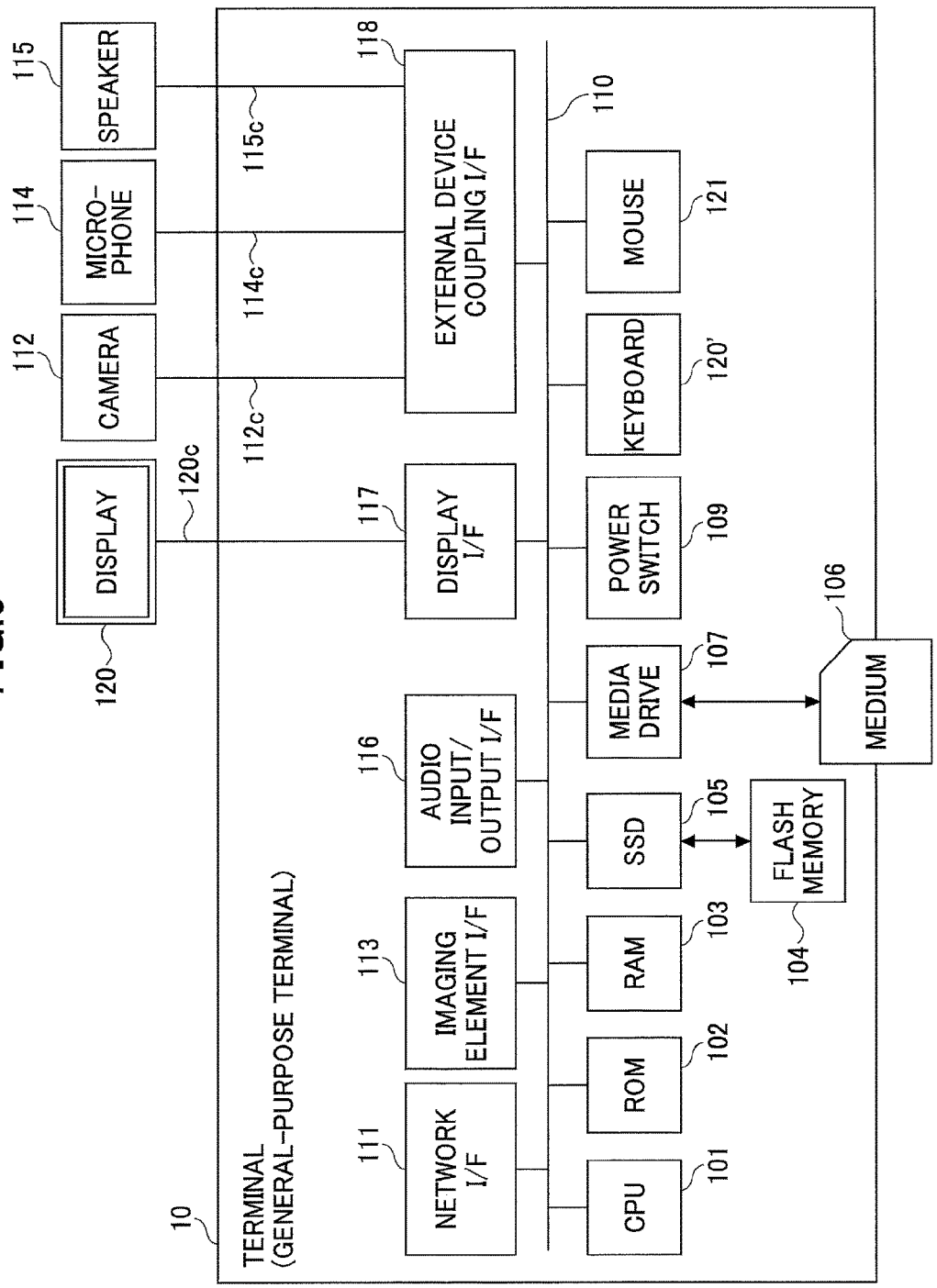
FIG. 5 is a diagram illustrating a hardware structure of the communication terminal.

Next, points of the hardware structure of the general-purpose terminal among the terminals 10 different from the hardware structure of the dedicated terminal are described. FIG. 5 is a diagram illustrating the hardware structure of the terminal 10 of the first embodiment. In the general-purpose terminal, the camera 112, the microphone 114, and the speaker 115 are external devices externally attached to the general-purpose terminal. The camera 112, the microphone 114, and the speaker 115 are coupled to the external device coupling I/F 118 by cables 112c, 114c, and 115c, respectively.

Further, the general-purpose terminal does not have the operation button 108 and instead has a keyboard 120 and a mouse 121 as means that receive an input of a character, a selected result, or the like. Further, the alarm lamp 119 is not disposed in the general-purpose terminal and is configured to report a defect in the terminal 10 using the speaker 115 or the display 120.

FIG. 6 is a diagram illustrating a hardware structure of the management system 50 of the first embodiment of the present invention. The management system 50 includes a CPU 201 controlling an overall operation of the management system 50, a ROM 202 storing a program such as IPL used to drive the CPU 201, a RAM 203 used as a work area for the CPU 201, a hard disk (HD) 204 storing various data such as a program for the management system 50, a hard disk drive (HDD) 205 controlling to read or write various data from or to the HD 204, a media drive 207 controlling to read or write (store) the data from or to the recordable medium 206 such as a flash memory, a display 208 displaying various information items such as a cursor, a menu, a window, a character, or an image, a network I/F 209 for conducting data communication using the communication network 2, a keyboard 211 having multiple keys for inputting characters, numeric values, and various commands, a mouse 212 selecting and/or executing a command, selecting an object to be processed, or moving the cursor, a CD-ROM drive 214 controlling a data read/write operation on a CD-ROM (Compact Disc Read-Only Memory) 213, and a bus line 210 such as an address bus and a data bus for electrically coupling the above components as illustrated in FIG. 6.

Meanwhile, the relay terminal 30, the app server 80, the program providing system 90, and the maintenance system 100 may have hardware structures similar to the hardware structure of the management system 50. Therefore, descriptions of these hardware structures are omitted.

Figure 7:
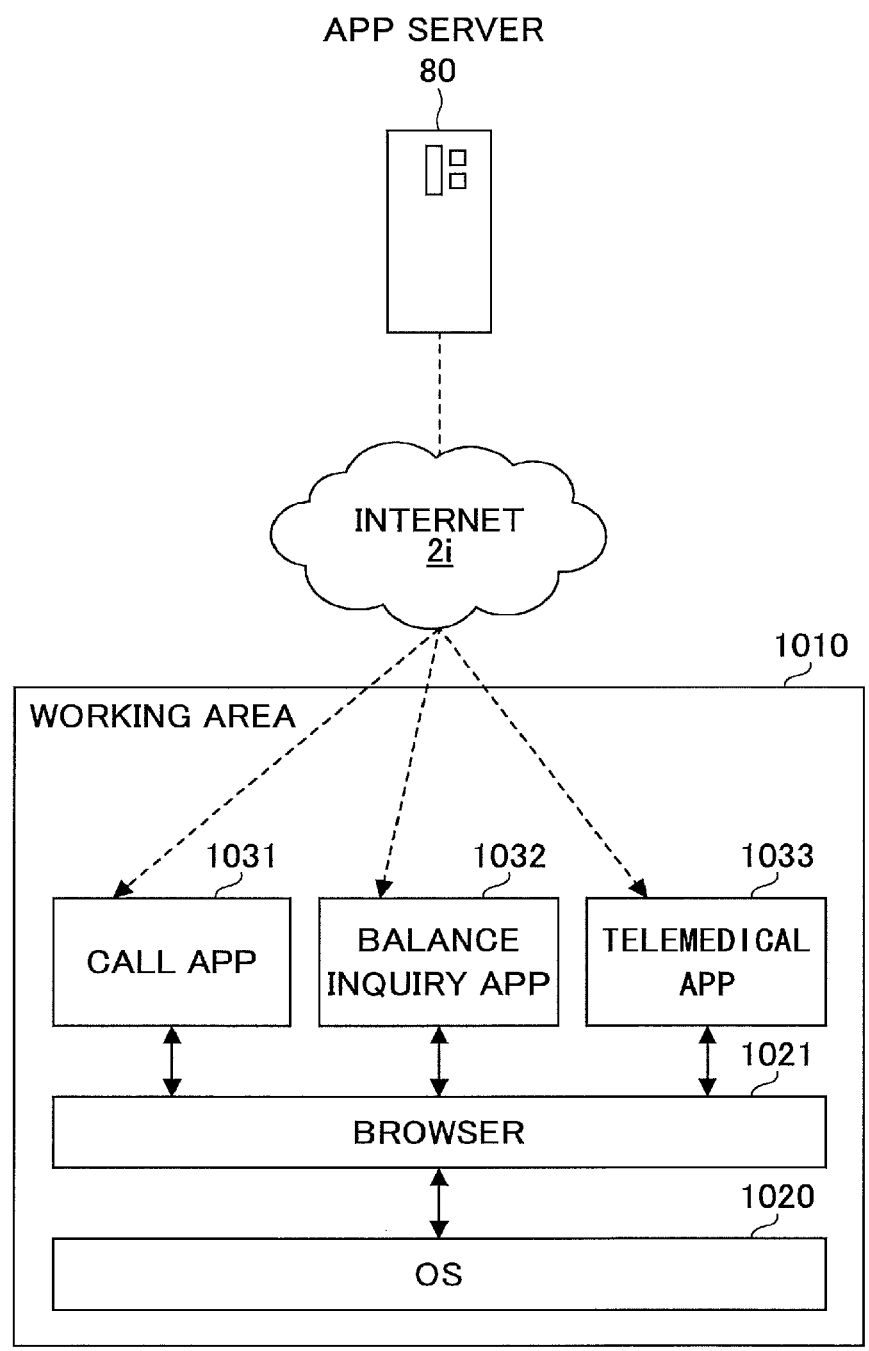
FIG. 7 is a diagram illustrating a software structure of the communication terminal.

Subsequently, a software structure of the terminal 10 is described. FIG. 7 is a diagram illustrating the software structure of the terminal 10. As illustrated in FIG. 7, an operating system (OS) 1020, a call app 1031, a balance inquiry app 1032, and a telemedical app 1033 are operated in a working area 1010 of the RAM 103. The OS 1020 is not specifically limited and is installed on the terminal 10 before the factory shipment. The call app 1031, the balance inquiry app 1032, and the telemedical app 1033 may be acquired from the app server 80 after the factory shipment and installed.

In this, the OS 1020 is basic software which provides basic functions and manages the terminal in the entirety. The browser 1021 is software which is operable on the OS 1020 and is used to display information in conformity with a predetermined purpose so as to be browsed. The call app 1031, the balance inquiry app 1032, and the telemedical app 1033 are software which is operable in the browser 1021 and is used for purposes of communications with the other terminal 10, an inquiry of a communication charge, and so on. According to the first embodiment, the call app 1031, the balance inquiry app 1032, and the telemedical app 1033 may correspond to different communication protocols, respectively.

Three apps of the call app 1031, the balance inquiry app 1032, and the telemedical app 1033 are described as an example for brevity of explanation. Another app may be installed. Further, in a case where multiple call apps are installed, the multiple call apps may use different protocols as the above described (1) to (7).

<<Functional Structure of the Embodiment>>

Figure 8:
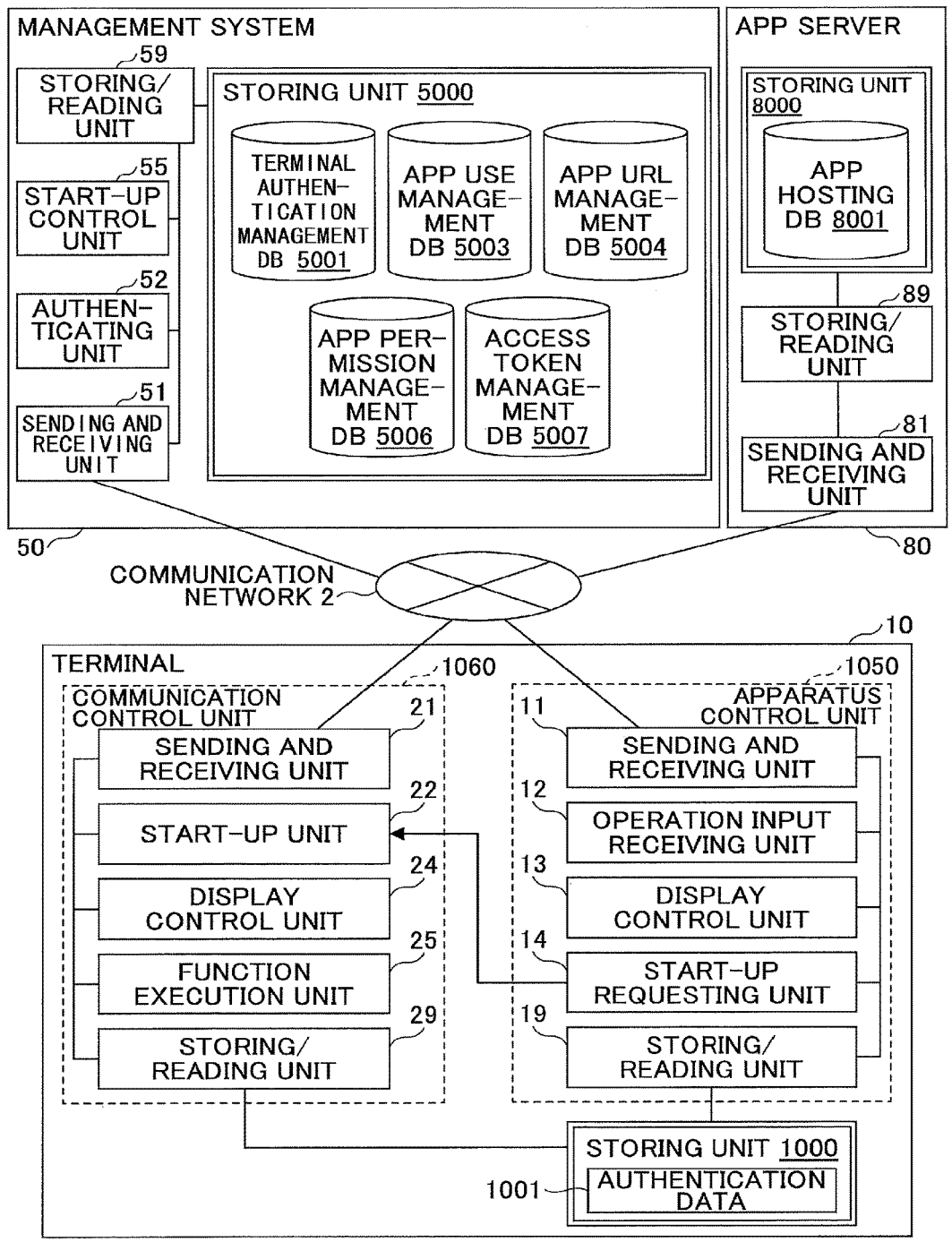
FIG. 8 is a functional block diagram illustrating the communication terminal, a communication management system, and an application server.

Next, the functional structure of the first embodiment is described. FIG. 8 is a functional block diagram illustrating the terminal 1, the management system 50, and the app server 80, which form a part of the communication system 1 of the first embodiment. Referring to FIG. 8, the terminal 10 and the management system 50 are coupled by the communication network 2 so as to be capable of conducting data communications via the communications network 2.

<Functional Structure of Communication Terminal>

The terminal 10 includes an apparatus control unit 1050 and a communication control unit 1060. In this, the apparatus control unit 1050 is implemented by starting up the OS 1020 and the browser 1021, which are illustrated in FIG. 7. Further, the communication control unit 1060 is implemented by starting up any one of the call app 1031, the balance inquiry app 1032, and the telemedical app 1033, which are illustrated in FIG. 7.

The apparatus control unit 1050 includes a sending and receiving unit 11, an operation input receiving unit, a display control unit 13, a start-up requesting unit 14, and a storing/reading unit 19. The sending and receiving unit 11, the operation input receiving unit, the display control unit 13, the start-up requesting unit 14, and the storing/reading unit 19 are functions implemented when any one of composing elements illustrated in FIGS. 4 and 5 is operated by a command from the CPU 101 in conformity with a program expanded from the flash memory 104 to the RAM 103.

The communication control unit 1060 includes a sending and receiving unit 21, a start-up unit 22, a display control unit 24, a function execution unit 25, and a storing/reading unit 29. The sending and receiving unit 21, the start-up unit 22, the display control unit 24, the function execution unit 25, and the storing/reading unit 29 are functions implemented when any one of composing elements illustrated in FIGS. 4 and 5 is operated by a command from the CPU 101 in conformity with a call app (a program) expanded from the flash memory 104 to the RAM 103.

Further, the terminal 10 includes a storing unit 1000 built up by the ROM 102, the RAM 103, and the flash memory 104, which are illustrated in FIGS. 4 and 5.

(Authentication Data)

Authentication data 1001 as authentication information used for authenticating a login request source when the terminal 10 requests for a login to the management system 50 are stored in the storing unit 1000 of the terminal 10. According to the first embodiment, certificate information is stored in the dedicated terminal among the terminals 10 and a password is arbitrarily stored in the dedicated terminal. With this, in the dedicated terminal, client certificate authentication is usable and password authentication can be arbitrarily used. A password is stored in the general-purpose terminal. With this, the password authentication is usable in the general-purpose terminal.

(Functional Structures of Apparatus Control Unit)

Referring to FIG. 8, functional structures of the apparatus control unit 1050 of the terminal 10 are described in detail. Hereinafter, in explaining the functional structures of the apparatus control unit 1050 of the terminal 10, a relationship between the functional structures and main composing elements used to implement the functional structures of the apparatus control unit 1050 among the composing elements illustrated in FIGS. 4 and 5 is also explained.

The sending and receiving unit 11 of the terminal 10 illustrated in FIG. 8 is implemented by a command from the CPU 101 and the network I/F 111, which are illustrated in FIGS. 4 and 5, and sends and receives various data (or various information) to a counterpart terminal, various apparatuses, or a system through the communication network 2.

The operation input receiving unit 12 is implemented by a command from the CPU 101 illustrated in FIGS. 4 and 5 and the operation buttons (108a, 108b, 108c, 108d, and 108e) and the power switch 109, which are illustrated in FIG. 3, and receives various inputs and various selections from the user. For example, when the user turns on the power switch 109 illustrated in FIG. 3, the operation input receiving unit 12 illustrated in FIG. 8 receives the turning-on of the power source and turns on the power source.

The display control unit 13 is implemented by a command from the CPU 101 and the display I/F 117, which are illustrated in FIGS. 4 and 5, and performs a control of sending image data sent from a counterpart side during the communication to the display 120.

The storing/reading unit 19 is implemented a command from the CPU 101 and the SSD 105, which are illustrated in FIGS. 4 and 5, or the command from the CPU 101. The storing/reading unit 19 stores various data in the storing unit 1000 and reads the various data stored in the storage unit 1000.

The start-up requesting unit 14 is a function implemented by the browser 1021 based on the command from the CPU 101 illustrated in FIGS. 4 and 5, and requests a start-up of the call apps 1031, 1032, 1033, and 1034 to the communication control unit 1060.

(Functional Structures of Communication Control Unit)

Referring to FIGS. 4, 5, and 8, various functional structures of the communication control unit 1060 of the terminal 10 are described in detail. Hereinafter, in explaining the functional structures of the communication control unit 1060 of the terminal 10, a relationship between the functional structures and main composing elements used to implement the functional structures of the communication control unit 1060 among the composing elements illustrated in FIGS. 4 and 5 is also explained.

The sending and receiving unit 21 illustrated in FIG. 8 is implemented by a command from the CPU 101 and the network I/F 111, which are illustrated in FIGS. 4 and 5, and sends and receives various data (or various information) to a counterpart terminal, various apparatuses, or a system through the communication network 2.

The start-up unit 22 is implemented by a command from the CPU 101, which is illustrated in FIGS. 4 and 5, and starts up an operation of the communication control unit 1060 (the call app) based on a start-up request from the operation input receiving unit 12 in a case where the operation input receiving unit 12 of the apparatus control unit 1050 receives a selection of the app by the user.

The display control unit 24 is implemented by a command from the CPU 101 and the display I/F 117, which are illustrated in FIGS. 4 and 5, and performs a control of sending screen data to the display 120.

The function execution unit 25 is implemented by a command from the CPU 101, the camera 112, the microphone 114, and the speaker 115, which are illustrated in FIGS. 4 and 5, and performs a control for implementing communications using an image, an audio, or the like.

The storing/reading unit 29 is implemented by a command from the CPU 101 and the SSD 105, which are illustrated in FIGS. 4 and 5, or the command from the CPU 101. The storing/reading unit 29 stores various data in the storing unit 1000 and reads the various data stored in the storage unit 1000.

<Functional Structure of Management System>

The management system 50 includes a sending and receiving unit 51, an authenticating unit 52, a start-up control unit 55, and a storing/reading unit 59. The sending and receiving unit 51, the authenticating unit 52, the start-up control unit 55, and the storing/reading unit 59 are functions or means implemented when any of the composing elements illustrated in FIG. 6 operates in response to the command from the CPU 201 in conformity with a program for the management system 50 received from the HD 204 and expanded in the RAM 203. Further, the management system 50 includes a storing unit 5000 that is built up by the HD 204 illustrated in FIG. 6. DBs 5001, 5002, 5003, 5006, and 5007 including various tables described below are built up in the storing unit 5000.

(Terminal Authentication Management Table)

FIG. 9 is a schematic diagram of a terminal authentication management table. A terminal authentication management DB 5001 including a terminal authentication management table illustrated in FIG. 9 is built up in the storing unit 5000. In the terminal authentication management table, terminal IDs of all the terminals 10 managed by the management system 50 are managed in association with an authentication password and information indicative of admissibility of the certificate authentication. For example, the terminal authentication management table illustrated in FIG. 9 indicates that, in the terminal 10aa having a terminal ID of "01aa", the password authentication can be used and the password for the password authentication is "aaaa". Further, the terminal authentication management table indicates that, in the terminal 10ab having a terminal ID of "01ab", the certificate authentication can be used. Further, the terminal authentication management table indicates that, in the terminal 10ac having a terminal ID of "01ac", the password authentication and the client certificate authentication can be used and the password for the password authentication is "cccc". By limiting the authentication method by each terminal 10, it is possible to limit the usable authentication method for all the usable application by each terminal 10. Within the first embodiment, the terminal ID may be information which can specify the terminal of a communication destination, and may be information which is inherent in the terminal and information which is not inherent in the terminal. For example, the terminal ID may be information which identifies the user using the terminal 10 or identification information stored in a recording medium from which the terminal can read the identification information.

(App Use Management Table)

FIG. 10 is a schematic diagram of an app use management table. An app use management DB 5003 including the app use management table illustrated in FIG. 10 is built up in the storing unit 5000. In this app use management table, use availability information indicative of use availability of the app is managed in association with each terminal ID for identifying the terminal 10 and each app ID for identifying the app for teleconference. The use availability information "On" indicates that the app is usable, and the use availability information "Off" indicates that the app is not usable.

In the app use management table, in a case where the app is usable, the corresponding condition can be added and managed.

For example, the app use management table illustrated in FIG. 10 indicates that the call app identified by the app ID "a001" and the balance inquiry app identified by the app ID "a002" are usable by the terminal 10aa having the terminal ID "01aa" and the telemedical app identified by the app ID "a003" is not usable by the terminal 10aa. In this case a usable period of the call app is from "Jan. 1, 2014" to "Sep. 30, 2014".

(App URL Management Table)

FIG. 11 is a schematic diagram of an app URL management table. An app use management DB 5004 including the app use management table illustrated in FIG. 11 is built up in the storing unit 5000. This app URL management table manages each one of multiple app IDs in association with URL information of icon data of the corresponding app in the communication network 2 and URL information of the corresponding app in the communication network 2.

(App Permission Management Table)

FIG. 12 is a schematic diagram of an app usage management table. An app permission management DB 5006 including the app permission management table illustrated in FIG. 12 is built up in the storing unit 5000. This app permission management table manages each app ID for identifying the apps in association with an authentication method effective as a method for authentication in a start-up request source of the corresponding app. With this, the management system 50 can permit an access to the app with conditions where the terminal 10 is authenticated using the authentication method effective for the intended app when a start-up request for starting up the intended app is received from the terminal 10. According to the app permission management table illustrated in FIG. 12, the call app identified by the app ID "a001" is permitted to access the app in a case where the start-up request source is authenticated by the password authentication or the client certificate authentication. Further, according to the app permission management table, the telemedical app identified by the app ID "a003" is permitted to access the app in a case where the start-up request source is authenticated by the client certificate authentication.

(Access Token Management Table)

FIG. 13 is a schematic diagram of an access token management table. An access token management DB 5007 including the access token management table illustrated in FIG. 13 is built up in the storing unit 5000. This access token management table manages each terminal ID for identifying the terminal ID of the terminal 10 and each app ID for identifying the app for the teleconference in association with an access token as permission information indicating that the access to the app is permitted. For example, according to the access token management table illustrated in FIG. 13, when the terminal 10*aa* identified by the terminal ID "01*aa*" is permitted to access the call app identified by the app ID "a001", an access token "abcdefg" is issued as the permission information.

<Functional Structure of Management System>

Described next in detail are various functional structures of the communication management system 50. Hereinafter, in explaining the functional structures of the communication management system 50, a relationship between the functional structures and main composing elements used to implement the functional structures of the communication management system 50 among the composing elements illustrated in FIG. 6 is also explained.

The sending and receiving unit 51 is implemented by a command from the CPU 201 illustrated in FIG. 6 and the network I/F 209 illustrated in FIG. 6, and sends and receives various data (or information) to and from each transmission terminal, an apparatus, or a system through the communication network 2.

The authenticating unit 52 is implemented by a command from the CPU 201 illustrated in FIG. 6, searches the terminal authentication management table (see FIG. 9) using the terminal ID and the password, which are received by the sending and receiving unit 51, as a search key, and authenticates the terminal by determining whether the same terminal ID and the same password are managed in this terminal authentication management table.

The start-up control unit 55 is implemented by a command from the CPU 201 illustrated in FIG. 6, determines whether the app corresponding to the start-up request, and controls to start up the app.

The storing/reading unit 59 is implemented by a command from the CPU 201 and the HDD 205, which are illustrated in FIG. 6, or the command from the CPU 201. The storing/reading unit 29 stores various data in the storing unit 5000 and extracts the various data stored in the storage unit 5000.

<Functional Structure of App Server>

The app server includes a sending and receiving unit 81 and a storing/reading unit 89. The sending and receiving unit 81 and the storing/reading unit 89 are functions or means implemented when any of the composing elements illustrated in FIG. 6 operates in response to the command from the CPU 201 in conformity with a program for the app server 80 received from the HD 204 and expanded in the RAM 203. Further, the app server 80 includes a storing unit 8000 that is built up by the HD 204 illustrated in FIG. 6.

(App Hosting DB)

An app hosting DB 8001 is built up in the storing unit 8000. The app hosting DB stores the app uploaded to the app server 80 and manages the app.

The sending and receiving unit 81 is implemented by a command from the CPU 201 illustrated in FIG. 6 and the network I/F 209 illustrated in FIG. 6, and sends and receives various data (or information) to and from each transmission terminal, an apparatus, or a system through the communication network 2.

The storing/reading unit 89 is implemented by a command from the CPU 201 illustrated in FIG. 6 and the HDD 205 illustrated in FIG. 6, or the command from the CPU 201. The storing/reading unit 89 stores various apps in the storing unit 8000 and extracts the various apps stored in the storage unit 8000.

<<Process or Operation of the Embodiment>>

Figure 14:
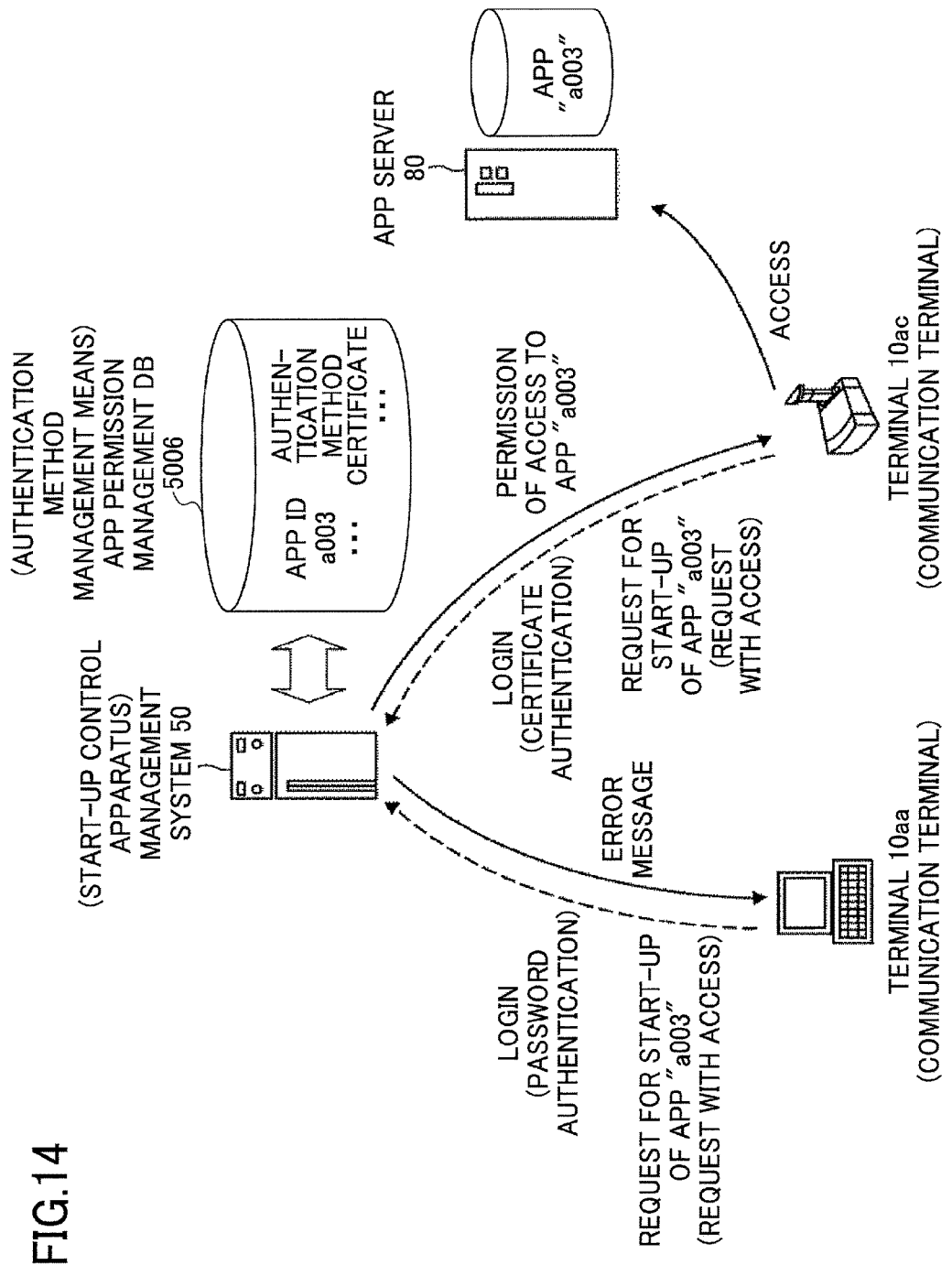
FIG. 14 is a schematic diagram illustrating a state of sending and receiving various information items in the communication system.

Subsequently, referring to FIG. 14, the summary of a process or an operation of the first embodiment is described. FIG. 14 is a schematic diagram illustrating a state of sending and receiving various information in the communication system 1. The management system 50 (an exemplary access control device) controls start-up of the app (an exemplary access control from the communication terminal to the application) based on a request from the terminal 10. The app permission management DB 5006 (an exemplary authentication method management means) of the management system 50 manages each app ID for identifying the app in association with an authentication method (exemplary authentication information) effective for authenticating a start-up request source (an exemplary access request source) of this app. Based on a login request from the terminal 10, the authenticating unit 52 (an exemplary authenticating means) of the management system 50 authenticates the terminal of a login request source using an authentication method usable by the terminal 10. The sending and receiving unit 51 (an exemplary access request receiving means) of the management system 50 receives a request (an exemplary request together with an access to an intended application) to start up the intended app from the terminal 10. In a case where the app permission management DB 5006 does not manage the authentication method used for authenticating the above terminal 10 in association with the app ID of the above intended app, the start-up control unit 55 (an exemplary access control means) control so that the terminal does not access the above intended app. On the other hand, in a case where the authentication method used for the authentication of the above terminal 10 is included in the app permission management DB 5006 in association with the app ID of the above intended app, the start-up control unit 55 controls to enable the terminal 10 to access the intended app from the terminal 10 by reporting the URI of the above intended app to the terminal. In a case where each terminal 10 is authenticated by an arbitrary authentication method and this arbitrary authentication method is not an authentication method effective for authenticating the start-up request source of the app, it is enabled to prevent the terminal 10 from accessing the app. Therefore, it becomes possible to assure security expected by the app side.

The app use management DB 5003 (an exemplary application management means) of the management system 50 manages each terminal ID of the terminal being the start-up request source (the exemplary access request source) of the terminal 10 in association with the app ID (exemplary application information) of the app usable in the terminal. The start-up control unit 55 controls to prevent the intended app from starting up in a case where the app use management DB 5003 does not manage the app ID indicative of the intended app in association with the terminal ID of the terminal 10 being the request source of the start-up of the intended app. Meanwhile, the start-up control unit 55 controls to start up the intended app in a case where the app use management DB 5003 manages the app ID indicative of the intended app in association with the terminal ID of the terminal 10 being the request source of the start-up of the intended app. In this case, because the access to the app can be controlled based on both enablement of using the app and effectiveness of the authentication method, the security is improved.

The app use management DB manages each terminal ID of the terminal 10 being the start-up request source of the app and each app ID in association with a usable period (exemplary period information) while the app is usable. With this, it is possible to set the usable period for each usable app usable in the terminal 10.

The app hosting DB 8001 (an exemplary storing means) in the app server 80 of the communication system 1 stores the app operated in the terminal 10. The start-up control unit 55 of the management system 50 can control the start-up of the app in the terminal 10 by reporting the URI (exemplary access information) for accessing the app stored in the app hosting DB 8001.

Figure 15:
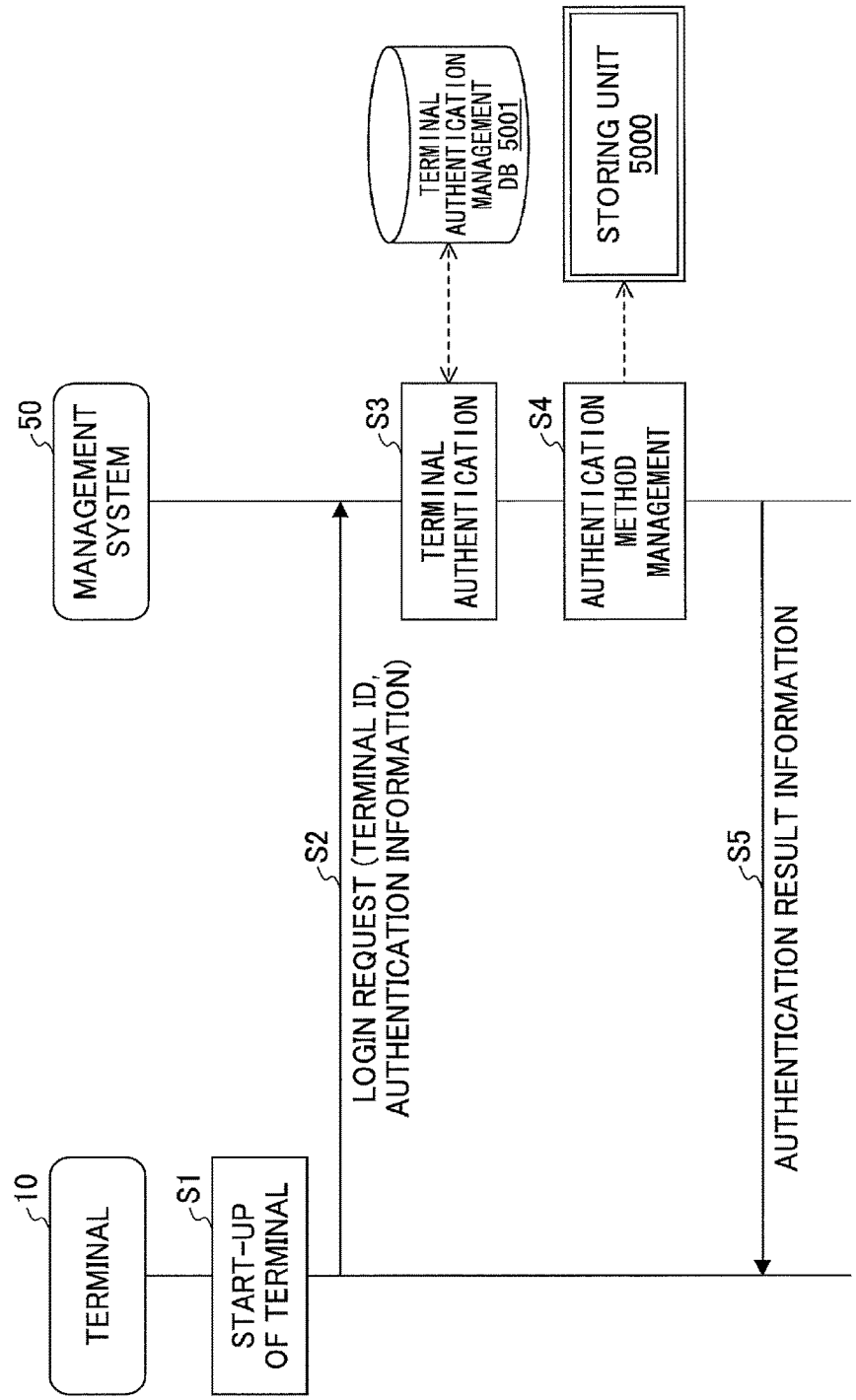
FIG. 15 is a sequence diagram illustrating a process in a preparation stage before starting communications.

Subsequently, the process or the operation of the first embodiment is described in detail. Referring to FIG. 15, described is a process in a preparation stage of preparing to start communications in the terminal 10. FIG. 15 is a sequence diagram illustrating the process in the preparation stage before starting communications. When the user turns on the power switch 109 illustrated in FIG. 3, the operation input receiving unit 12 illustrated in FIG. 8 receives an on action of a power source and causes the terminal to start up (step S1). The sending and receiving unit 11 sends a login request to the management system 50 through the communication network 2 using the authentication method usable in the terminal 10 in response to a receipt of the on-action of the power source (step S2). With this, the sending and receiving unit 51 of the management system 50 receives the login request. Here, the login request may be sent in response to an input of an instruction by the user into the terminal 10 being the login request source.

This login request includes authentication information for authenticating the login request source in conformity with the terminal ID identifying the terminal 10 being the own terminal as the request source and the authentication method usable in the terminal 10. The authentication information is a password, certificate information, or the like. The terminal ID and the authentication information may be read out from the storing unit 1000 via the storing/reading unit 19 and sent to the sending and receiving unit 11. Alternatively, the terminal ID and the password may be input by the user of the terminal 10 being the login request source. When login request information is sent from the terminal 10 to the management system 50, the management system 50 on the receiving side can acquire the IP address of the terminal 10 on the sending side.

Next, the authenticating unit 52 of the management system 50 authenticates the terminal 10 being the login request source based on the terminal ID and the authentication information, which are included in the login request information received via the sending and receiving unit 51 (step S3). At this time, in a case where the terminal 10 requests for the password authentication, a terminal authentication is conducted such that the terminal authentication management table (see FIG. 9) of the storing unit 5000 is searched using the password sent from the terminal 10, and it is determined whether the same terminal ID and the same password are managed in the terminal authentication management table. In a case where the terminal 10 requests for the client certificate authentication, the terminal authentication management table (see FIG. 9) of the storing unit 5000 is searched using the terminal ID sent from the terminal 10 to refer whether the client certificate authentication of the terminal 10 is permitted. In a case where the client certificate authentication is permitted, the terminal authentication is conducted by determining whether the client certificate information sent from the terminal 10 is authentic.

In a case where the terminal 10 is successfully authenticated, the storing/reading unit 59 causes the storing unit 5000 to store and manage the terminal ID of the terminal 10 being the login request source in association with the authentication method used for the authentication (step S4). Then, the sending and receiving unit 51 of the management system 50 transmits authentication result information indicating an authentication result obtained by the authenticating unit 52 to the terminal 10 being the login request source via the communication network 2 (step S5). With this, the sending and receiving unit 11 of the terminal 10 being the login request source receives the authentication result information. Described next is a case where the terminal is determined to have an authentic use authorization by the authenticating unit 52.

Figure 16:
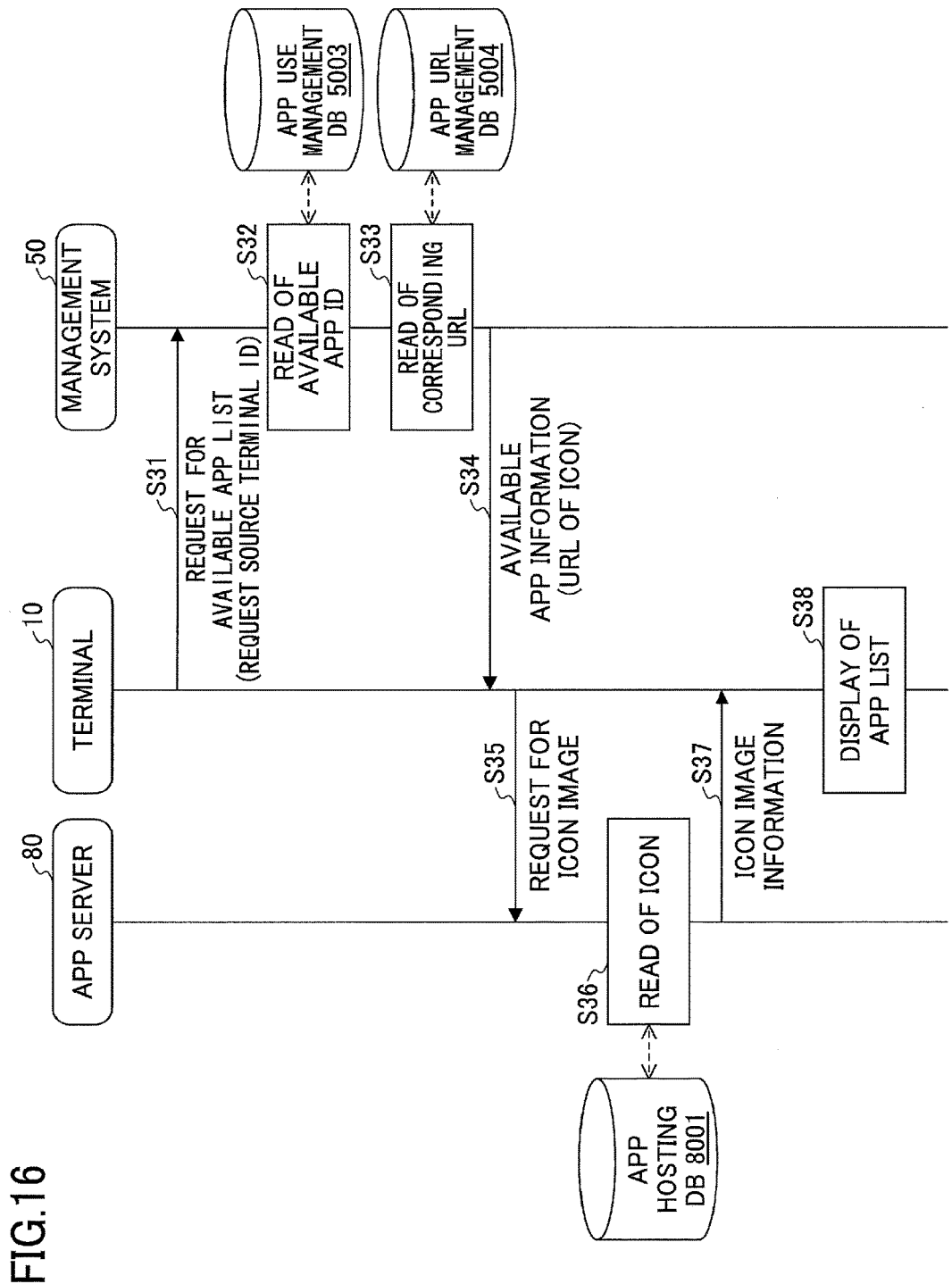
FIG. 16 is a sequence diagram illustrating a process after a start-up of the communication terminal until an app icon is displayed.

Referring to FIG. 16, described next is a process in which the terminal 10 displays an app icon indicating a candidate of an app requested to be started up. FIG. 16 is a sequence diagram illustrating the process of displaying the app icon.

After the terminal 10 logs in the management system 50 after the process between step S1 and step S5, the sending and receiving unit 11 of the terminal 10 requests the management system 50 via the communication network 2 to send a list of candidates of the usable app (step S31). With this, the sending and receiving unit 51 of the management system 50 receives the request for the usable app. This request includes the terminal ID of the terminal 10 being a list request source.

Next, the storing/reading unit 59 of the management system 50 searches the app use management table (see FIG. 10) using the terminal ID of the terminal 10 being the list request source received in step S31 as a search key. Thus, the storing/reading unit 59 reads out the app ID corresponding to this terminal ID and conditions of use (a start date of period of validity and an end date of period of validity) (step S32). Further, in a case where conditions of use are set for the app IDs read in step S32, the storing/reading unit 59 extracts the app ID having a period of validity (a period between the start date of period of validity and the end date of period of validity) at this time of the process. Then, the storing/reading unit 59 searches the app URL management table (see FIG. 11) using the extracted app ID as the search key, and reads URL information of an icon corresponding to this app ID (step S33).

Next, the sending and receiving unit 11 sends usable app information as the list of candidates of the usable app via the communication network 2 to the terminal 10 (step S34). The URL information of the icon read in step S33 is included in usable app information. With this, the sending and receiving unit 11 of the terminal 10 being the list request source receives the usable app information.

Next, the sending and receiving unit 11 of the terminal 10 accesses a resource, which exists in the app hosting DB 8001 and is indicated by the URL of the received icon in step S34, and requests to acquire image information of the icon (step S35). Thus, the sending and receiving unit 81 of the app server 80 receives an acquisition request to acquire image information of the icon.

Next, the storing/reading unit 89 of the app server 80 reads out image information of the icon requested in step S35 from the app hosting DB 8001 of the storing unit 8000 (step S36). The sending and receiving unit 81 sends the image information of the icon to the terminal 10 being the acquisition request source via the communication network (step S37). With this, the sending and receiving unit 11 of the terminal 10 being the acquisition request source receives the image information of the icon.

Figure 18:
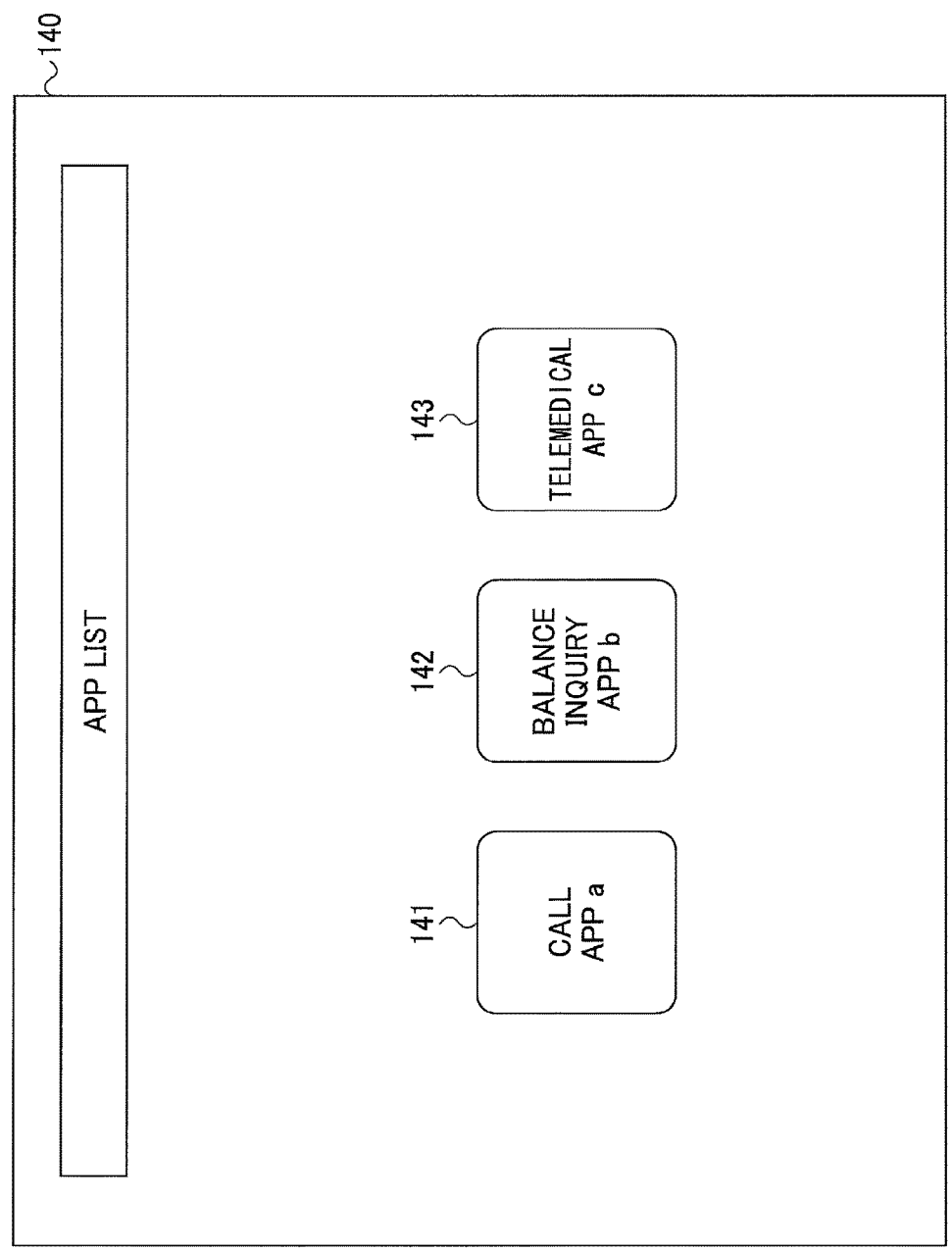
FIG. 18 illustrates an exemplary screen of an application list.

Next, the display control unit 13 causes the display 120 to display an "app list" screen 140 as illustrated in FIG. 18 (step S38). FIG. 18 illustrates an exemplary screen of the app list. The icon of the app which is within the period of validity is displayed on this screen 140. Here, three icons 141, 142, and 143 of the apps indicated by corresponding three app IDs a001, a002, and a003 are displayed.

Figure 17:
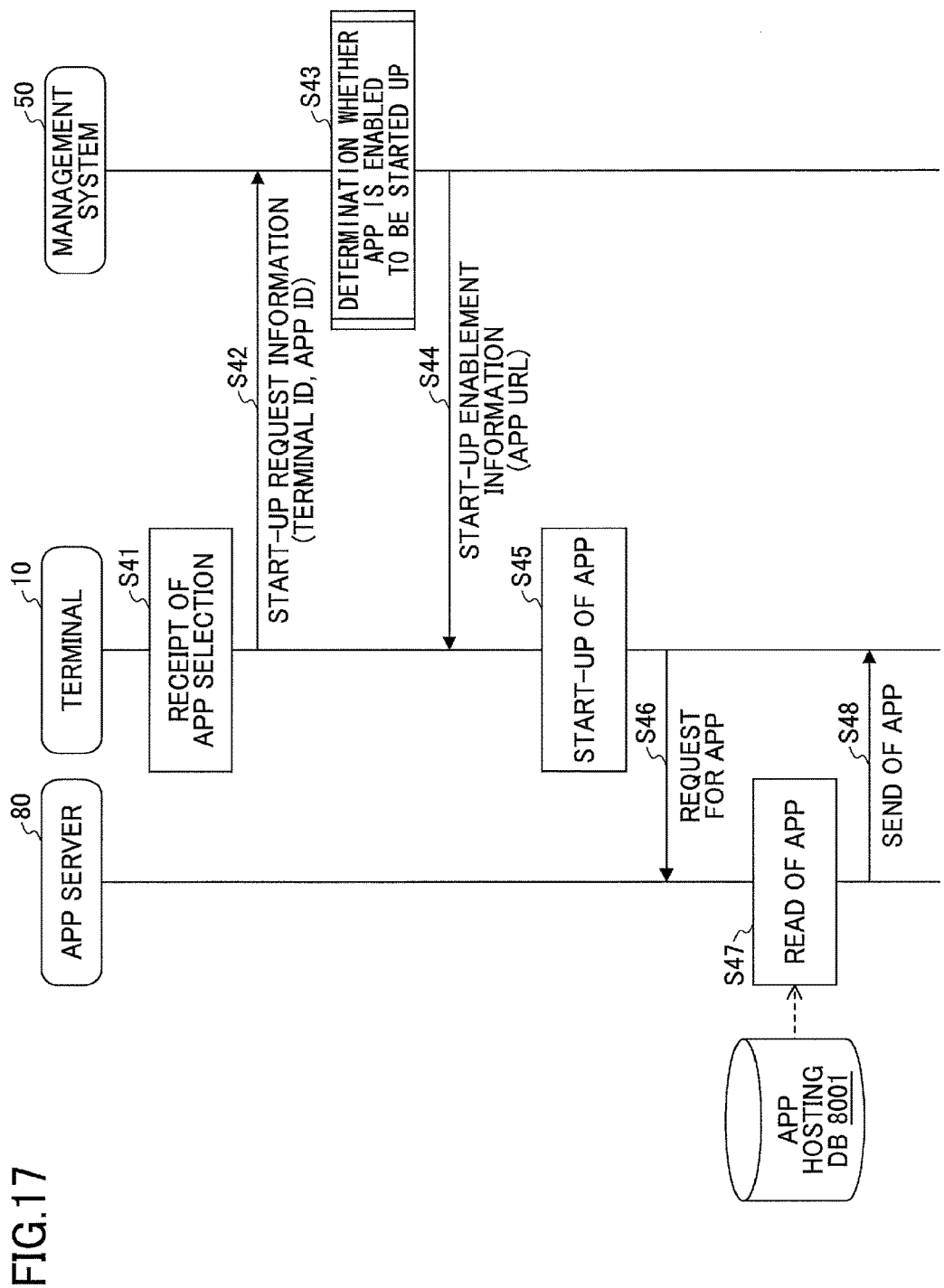
FIG. 17 is a sequence diagram illustrating a process of requesting for a start-up of the application.

Referring to FIG. 17, described next is a process of requesting to start up a selected app by selecting the app icon indicative of the intended app from the list of the apps. FIG. 17 is a sequence diagram illustrating the process of requesting for the start-up of the app.

At first, an intended icon is selected from multiple icons illustrated in FIG. 18 by an operation of the user, and then the operation input receiving unit 12 of the terminal 10 receives the selection of the app icon by the user (step S41). Subsequently, the sending and receiving unit 11 of the terminal 10 sends start-up request information indicative of a request to start up the selected app to the management system 50 via the communication network 2 (step S42). The start-up request information includes the terminal ID of the terminal being the start-up request source and the app ID of the selected app.

Figure 19:
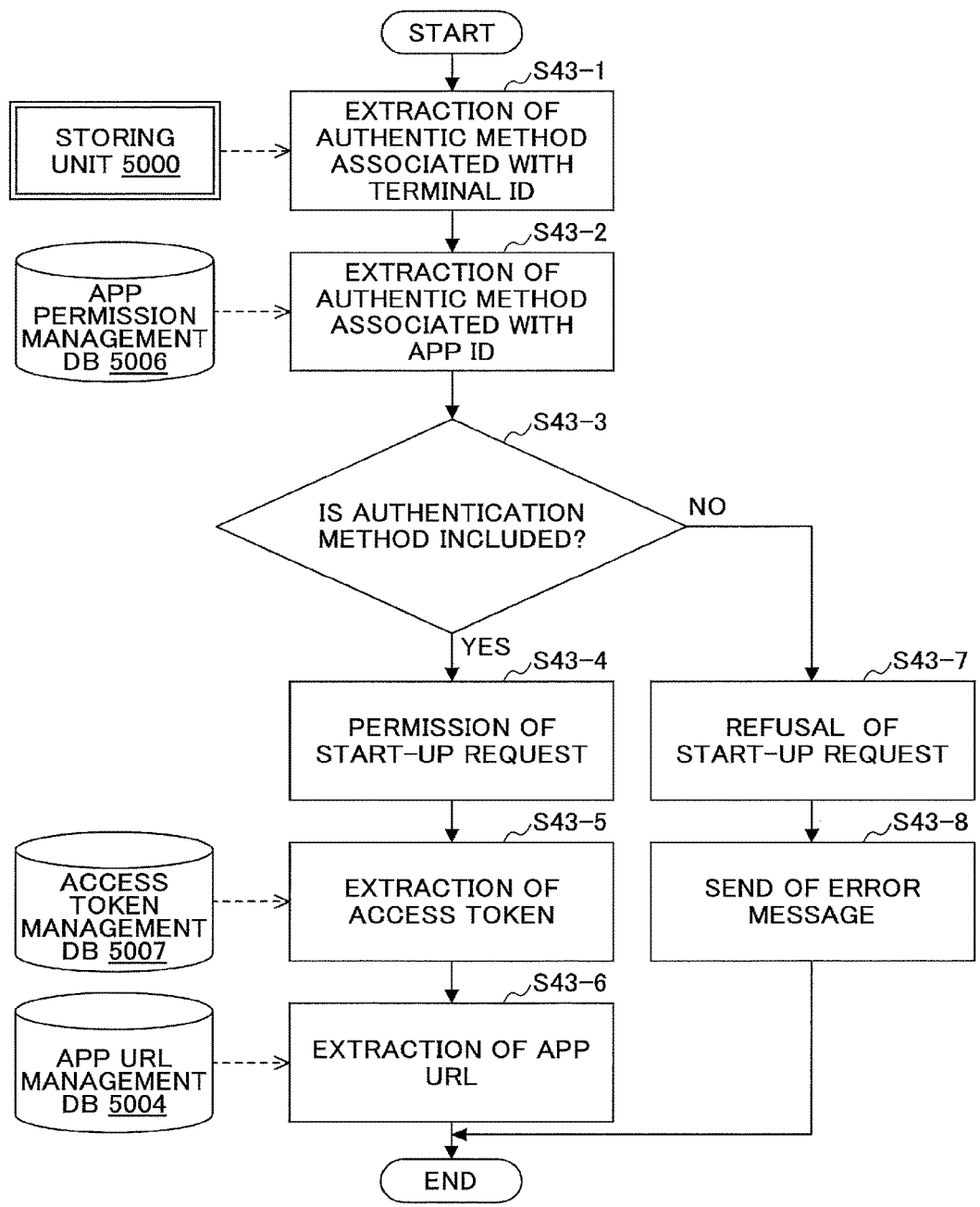
FIG. 19 is a flowchart illustrating a process of determining whether the start-up of the application is possible.

The sending and receiving unit 51 of the management system 50 receives a start-up request by receiving the start-up request information. When the start-up request is received, the start-up control unit 55 of the management system 50 determines whether the app corresponding to the start-up request can be started up (step S43). Referring to FIG. 19, the process of step S43 is described in detail. FIG. 19 is a flowchart illustrating the process of determining whether the start-up of the app is possible.

At first, the storing/reading unit 59 of the management system 50 searches the storing unit 5000 using the terminal ID of the terminal being the start-up request source as the search key to extract the authentication method used by the terminal 10 being the start-up request source (step S43-1). Subsequently, the storing/reading unit 59 searches the app permission management table (see FIG. 12) using the app ID of the app corresponding to the start-up request as the search key to extract the corresponding authentication method (step S43-2).

Next, the start-up control unit 55 determines whether the authentication method extracted in step S43-2 includes the authentication method extracted in step S43-1 (step S43-3). If the authentication method extracted in step S43-2 includes the authentication method extracted in step S43-1 (YES of step S43-3), the start-up control unit 55 permits a start-up request and controls a start-up of the app (S43-4).

In this case, the start-up control unit 55 searches the access token management table (see FIG. 13) using the terminal ID of the terminal 10 being the start-up request source and the app ID of the app requested by the start-up request, and extracts the corresponding access token (S43-5). Subsequently, the start-up control unit 55 searches the app URL management table (see FIG. 11) using the app ID of the app requested by the start-up request, and reads out the URL information of the corresponding app (S43-6).

If the authentication method extracted in step S43-2 does not include the authentication method extracted in step S43-1 (NO of step S43-3), the start-up control unit 55 refuses the start-up request to start up the app (S43-7). In this case, the sending and receiving unit 51 ends the process by sending an error message to the terminal 10 being the start-up request source (S43-8).

Described next is a case where the start-up control unit 55 permits the start-up of the app. At first the sending and receiving unit 51 of the management system 50 sends start-up enablement information indicating whether the app is permitted to start-up to the terminal 10 being the start-up request source (step S44). In a case where the start-up is permitted in step S43-4, the access token extracted in step S43-5 and the URL information of the app extracted in step S43-6 are sent as information for accessing the app requested by the start-up request.

When the sending and receiving unit 11 of the start-up request source receives the start-up enablement information, the display control unit 13 causes the display 120 to display the start-up enablement information indicating whether the app is permitted to start-up. In a case where the start-up is permitted, the start-up requesting unit 14 of the apparatus control unit 1050 illustrated in FIG. 8 commands the start-up unit 22 of the communication control unit 1060 to start up the app. Accordingly, the communication control unit 1060 starts up the app (step S45). Said differently, the app selected by the user is started up. The above described processes are conducted by the apparatus control unit 1050. The processes described below are conducted by the communication control unit 1060.

When the app starts up, the sending and receiving unit 21 sends the access token sent in step S44 to the app server 80 and simultaneously requests a download of the app by accessing the URL of the app included in the start-up enablement information (step S46). When a download request for downloading the app is received by the sending and receiving unit 81 of the app server 80, the storing/reading unit 89 reads the app specified by the URL (step S47). The read app is sent to the terminal 10 being a download request source by the sending and receiving unit 81. With this, the terminal 10 being the start-up request source can operate the app in the browser 1021.

Second Embodiment

Figure 20:
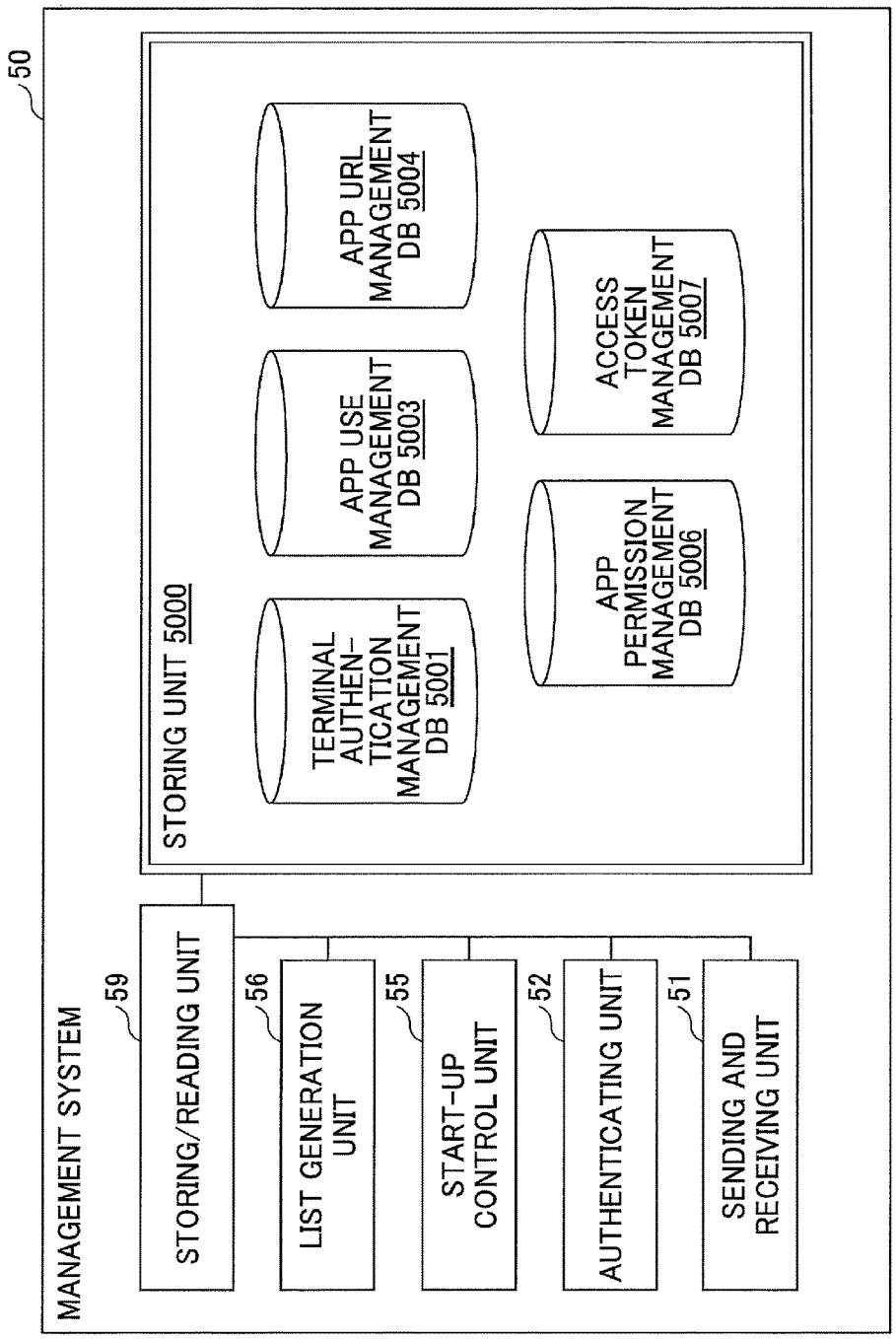
FIG. 20 is a functional block diagram illustrating a communication management system.

A second embodiment is described at points different from the first embodiment. The communication system 1 of the second embodiment differs from the communication system 1 of the first embodiment at a point that the management system 50 includes the list generation unit 56 as illustrated in FIG. 20. FIG. 20 is a functional block diagram illustrating the management system 50. The list generation unit 56 generates a list of the app which can be requested to start up in the terminal 10.

Figure 21:
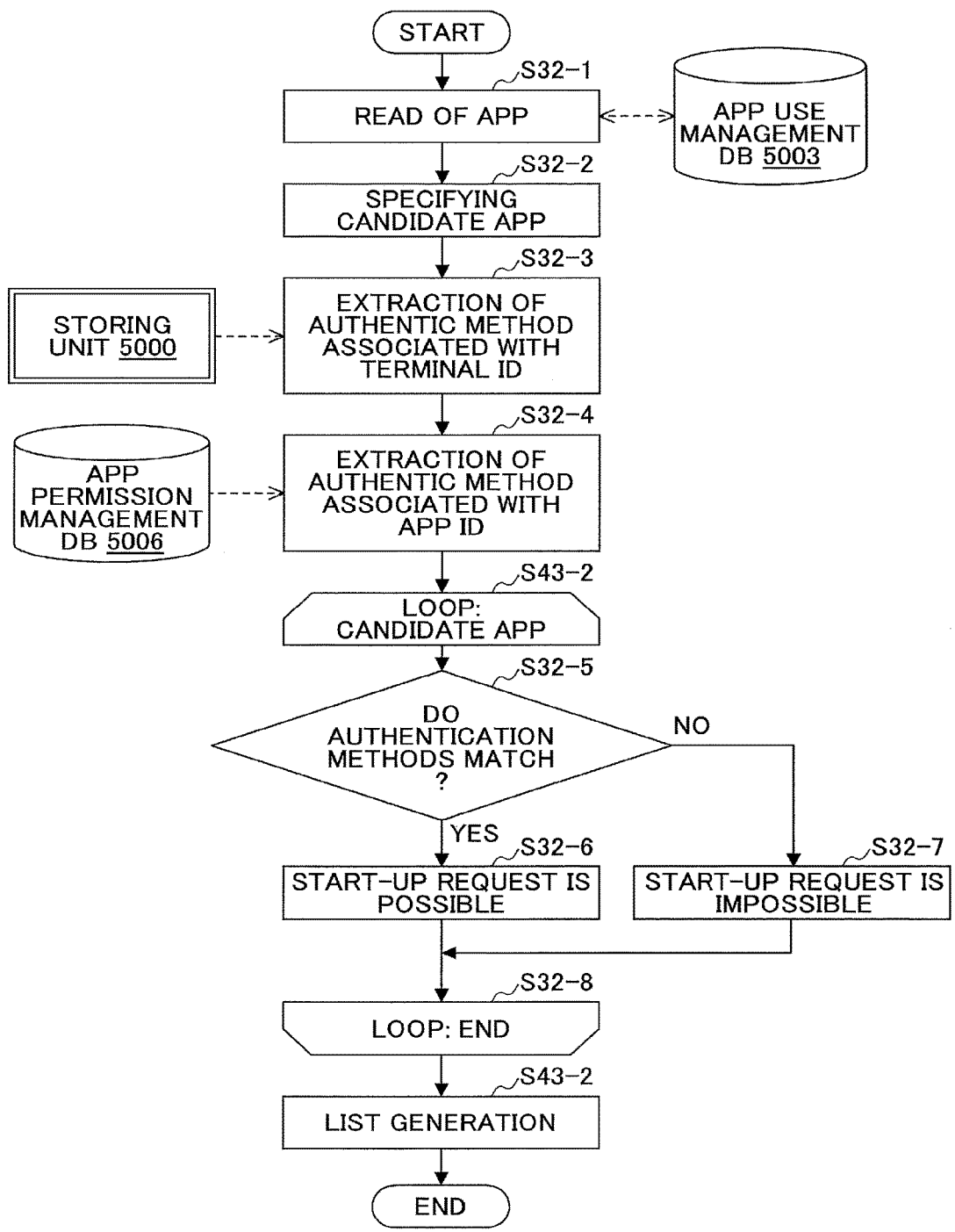
FIG. 21 is a flowchart illustrating a process of generating a list of the application.

Referring to FIG. 21, described next is the process and the operation of the second embodiment. FIG. 21 is a flowchart illustrating a process of generating the list of the app. Within the second embodiment, the process of step S32 in the first embodiment is changed to a sequential process illustrated in FIG. 21.

Next, the storing/reading unit 59 of the management system 50 searches the app use management table (see FIG. 10) using the terminal ID of the terminal 10 being the list request source as the search key. Thus, the storing/reading unit 59 reads out the app ID corresponding to this terminal ID, the start date of period of validity, and the end date of period of validity (step S32-1). Subsequently, the list generation unit 56 specifies the candidate of the app to be included in the list by omitting the app ID, which is not within the period of validity at the time of the process, from the read app ID (step S32-2).

Subsequently, the storing/reading unit 59 searches the storing unit 5000 using the terminal ID of the terminal being the list request source as the search key to extract the authentication method used by the terminal 10 being the list request source (step S32-3). Further, the storing/reading unit 59 searches the app permission management table (see FIG. 12) using the app ID of the candidate of the app specified in step S32-2 as the search key to extract the corresponding authentication method (step S32-4).

Further, the list generation unit 56 determines whether the authentication method extracted in step S32-3 matches the authentication method extracted in step S32-4 for each candidate of the app (step S32-5).

If the authentication method extracted in step S32-3 matches the authentication method extracted in step S32-4 (YES of step S32-5), the list generation unit 56 determines that the candidate of the app is included in a list of the app, which can be requested to start up (step S32-6). If the authentication method extracted in step S32-3 does not match the authentication method extracted in step S32-4 (NO of step S32-5), the list generation unit 56 determines that the candidate of the app is not included in the list of the app, which can be requested to start up (step S32-7).

After the determination whether the candidate of the app is included in the list is done for every app, the list generation unit 56 generates the list of the app, which can be requested to start up in the terminal 10, using the app ID determined to be included in the list (step S32-8).

After the list is completely generated, the storing/reading unit 59 searches the app URL management table (see FIG. 11) using each app ID included in the list generated in step S32 as the search key, and reads the URL information of the icon corresponding to this app ID (step S33). Because the processes on or after the above process is similar to the processes of the first embodiment, the description is omitted.

<<Supplement of the Embodiment>>

The relay terminal 30, the management system 50, the program providing system 90, and the maintenance system 100 may be built up by a single computer or may be built up by multiple computers where the maintenance system 100 is divided into parts (functions or means) and the parts are arbitrarily allocated to the multiple computers. Further, in a case where the program providing system 90 is built up by the single computer, a program sent by the program providing system 90 may be divided into multiple modules and sent, or may not be divided and sent. Further, in a case where the program providing system 90 is built up by multiple computers, the program divided into the multiple modules may be sent from each computer.

A recording medium such as a CD-ROM, in which the program for the terminal, the program for the relay terminal, or the program for the transmission management of the embodiments, the HD 204 storing the above programs, and the program providing system 90 including the HD 204 can be used as a program product when the program for the terminal, the program for the relay terminal, or the program for the transmission management is domestically and internationally provided to a user and so on.

Further, each ID of the embodiments is identification information such as a language, a character, a symbol, or various marks, which are used to uniquely identifying each ID. Each ID may also be the identification information, which is a combination of at least two of the language, the character, the symbol, or the various marks.

For example, the app ID is exemplary app identification information. This app identification information includes a name of the app and so on in addition to the app ID. The terminal ID is exemplary terminal identification information. This terminal identification information includes a manufacturing number of the terminal 10, a user ID allocated to the user of the terminal 10, and so on in addition to the terminal ID.

Further, the icon illustrated in FIG. 18 may include a character, a dingbat, or the dingbat associated with a character or a symbol.

Although a teleconference terminal is described above as an example of the terminal 10, the terminal 10 is not limited thereto. For example, one or both of a request source terminal and a destination terminal may be an internet protocol (IP) telephone set, an Internet telephone set, a personal computer (PC), or the like. The terminal 10 is not limited to a terminal enabled to do communications, and may be a communication terminal such as a smartphone, a tablet terminal, a game machine, and a car navigation system, as an information processing terminal enabled to do various data communications other than the communications. In this case, the communication management system 50 conducts various processes as a communication management system.

As described above, according to the invention, the access control device manages each application while associating authentication information, which indicates an authentication method effective for authenticating an access request source of the respective application, with each application. With this, in a case where the access request source of the application is authenticated by an arbitrary authentication method and this authentication method is not the effective authentication method, it is enabled that the access request source is prevented from accessing the application. Therefore, there is an effect that the security expected by an application side is easily assured.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

Referring to figures, the embodiments of the present invention have been described in detail above. The above description is provided for understanding of the embodiments and does not limit the scope of the embodiments. Further, the above multiple embodiments are not mutually exclusive. Therefore, as long as a contradiction does not occur, it is intended to combine elements of different embodiments. Various modifications and can be made within a range of a summary of a disclosed technique recited in the scope of claims.

What is claimed is:

1. An access control device for controlling an access by a communication terminal to an application, the access control device comprising:
   a central processing unit (CPU) configured to:
      manage the application in association with authentication information, which indicates an effective authentication method effective for authenticating an access request source of an access request to access the application;
      authenticate the access request source using a usable authentication method, which can bo is used in the communication terminal, based on the access request;

receive the access request to access an intended application from the communication terminal;

control the communication terminal so that the communication terminal does not access the intended application when the CPU does not manage the authentication information, which indicates the effective authentication method used for authenticating the access request source, in association with the intended application, and the communication terminal accesses the intended application when the CPU manages the authentication information, which indicates the effective authentication method used for authenticating the access request source, in association with the intended application; and manage each access request source to the application in association with application information, which indicates the application used in the access request source, wherein the CPU controls the communication terminal so that the communication terminal is prevented from accessing the intended application when the CPU does not manage the application information indicative of the intended application in association with the access request source to the intended application, and the communication terminal accesses the intended application when the CPU manages the application information indicative of the intended application in association with the access request source, and the CPU manages in association with period information, which indicates a period while the application is used, for each of the access request source and for each of the application information.

2. A communication system comprising:

the access control device according to claim 1; and an application server including a storing means storing the application.

3. The communication system according claim 2, wherein the access control device controls the access to the intended application by reporting access information for accessing the intended application stored in the storing means of the application ser ver to the communication terminal.

4. The communication system according claim 2, the communication system further comprising:

the communication terminal as the access request source.

5. A non-transitory recording medium storing a program which, when executed by a processor of an access control device for controlling an access by a communication terminal to an application, causes the access control device to:

manage the application in association with authentication information, which indicates an effective authentication method effective for authenticating an access request source of an access request to access the application;

authenticate the access request source using a usable authentication method, which is used in the communication terminal, based on the access request;

receive the access request to access an intended application from the communication terminal;

control the communication terminal so that the communication terminal does not access the intended application when the authentication information, which indicates the effective authentication method used for authenticating the access request source, is not managed in association with the intended application, and the communication terminal accesses the intended application when the authentication information, which indicates the effective authentication method used for authenticating the access request source, is managed in association with the intended application;

manage each access request source to the application in association with application information, which indicates the application used in the access request source; and control the communication terminal so that the communication terminal is prevented from accessing the intended application when the application information, indicative of the intended application, is not managed in association with the access request source to the intended application, and the communication terminal accesses the intended application when the application information, indicative of the intended application, is managed in association with the access request source, wherein each access request source is managed in association with each of the application information and with period information that indicates a period while the application is used.

6. A method, performed by a processor of an access control device for controlling an access by a communication terminal to an application, the method comprising:

managing the application in association with authentication information, which indicates an effective authentication method effective for authenticating an access request source of an access request to access the application;

authenticating the access request source using a usable authentication method, which is used in the communication terminal, based on the access request;

receiving the access request to access an intended application from the communication terminal;

controlling the communication terminal so that the communication terminal does not access the intended application when the authentication information, which indicates the effective authentication method used for authenticating the access request source, is not managed in association with the intended application, and the communication terminal accesses the intended application when the authentication information, which indicates the effective authentication method used for authenticating the access request source, is managed in association with the intended application;

managing each access request source to the application in association with application information, which indicates the application used in the access request source; and controlling the communication terminal so that the communication terminal is prevented from accessing the intended application when the application information, indicative of the intended application, is not managed in association with the access request source to the intended application, and the communication terminal accesses the intended application when the application information, indicative of the intended application, is managed in association with the access request source, wherein each access request source is managed in association with each of the application information and with period information that indicates a period while the application is used.

* * * * *